United States Patent
Miyakawa

(10) Patent No.: US 8,725,877 B2
(45) Date of Patent: May 13, 2014

(54) SESSION CONTROL SYSTEM, SESSION CONTROL METHOD AND SESSION CONTROL PROGRAM

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/347,349

(22) Filed: Jan. 10, 2012

(65) Prior Publication Data

US 2012/0144011 A1 Jun. 7, 2012

Related U.S. Application Data

(62) Division of application No. 12/665,797, filed on Dec. 21, 2009, now Pat. No. 8,291,080.

(30) Foreign Application Priority Data

Jun. 29, 2007 (JP) ................................. 2007-173267

(51) Int. Cl.
G06F 15/173 (2006.01)

(52) U.S. Cl.
USPC ................ 709/226; 709/227; 709/230; 705/7

(58) Field of Classification Search
USPC .................................................. 709/226–228
See application file for complete search history.

(56) References Cited

U.S. PATENT DOCUMENTS

| | | | |
|---|---|---|---|
| 7,103,770 B2 * | 9/2006 | Conrath ......................... | 713/155 |
| 7,546,371 B1 * | 6/2009 | Cheng et al. .................. | 709/227 |
| 7,657,611 B2 * | 2/2010 | Tsun et al. ..................... | 709/219 |
| 7,788,394 B2 * | 8/2010 | Gregotski et al. ............. | 709/231 |
| 7,917,623 B2 * | 3/2011 | Dezonno et al. .............. | 709/226 |
| 2004/0010592 A1 * | 1/2004 | Carver et al. .................. | 709/226 |
| 2005/0114514 A1 * | 5/2005 | Bostrom et al. ............... | 709/227 |
| 2005/0120007 A1 * | 6/2005 | Hild et al. .......................... | 707/3 |
| 2005/0120233 A1 * | 6/2005 | Halcrow et al. ............... | 713/193 |
| 2005/0154717 A1 * | 7/2005 | Watson et al. ..................... | 707/3 |
| 2005/0195975 A1 * | 9/2005 | Kawakita ......................... | 380/30 |
| 2005/0213580 A1 * | 9/2005 | Mayer et al. ............... | 370/395.2 |

(Continued)

OTHER PUBLICATIONS

Session-based admission control: a mechanism for peak load management of commercial Web sites Cherkasova, L.; Phaal, P. Computers, IEEE Transactions on vol. 51, Issue: 6 Topic(s): Computing & Processing (Hardware/Software); Digital Object Identifier: 10.1109/TC. 2002 pp. 669-685.*

(Continued)

*Primary Examiner* — Wing F Chan
*Assistant Examiner* — Razu Miah
(74) *Attorney, Agent, or Firm* — Sughrue Mion, PLLC

(57) ABSTRACT

A session control device connected to a web site and a client terminal through a network, which includes a calculation unit for calculating, with a state of a session in each access to a reference page which is a page whose effect is large on arrival at processing whose importance in the web site is high as a stage, a tendency of a session toward the processing whose importance is high on a stage basis, a storage unit for storing a calculated tendency toward the processing whose importance is high, a setting unit for setting a reference for limiting the session, and a collation unit for comparing a tendency toward the processing whose importance is high with respect to a stage of the session received from the client terminal and comparing with the reference to determine whether to limit the session from the client terminal.

6 Claims, 18 Drawing Sheets

(56) References Cited

U.S. PATENT DOCUMENTS

| | | | |
|---|---|---|---|
| 2006/0031750 A1* | 2/2006 | Waldorf et al. | 715/501.1 |
| 2006/0036748 A1* | 2/2006 | Nusbaum et al. | 709/228 |
| 2007/0050504 A1* | 3/2007 | Gomez et al. | 709/226 |
| 2007/0083533 A1* | 4/2007 | Mirkazemi et al. | 707/100 |
| 2007/0136814 A1* | 6/2007 | Lee et al. | 726/25 |
| 2007/0156413 A1* | 7/2007 | Cai et al. | 705/1 |
| 2007/0276732 A1* | 11/2007 | Lee et al. | 705/14 |
| 2008/0071767 A1* | 3/2008 | Grieselhuber et al. | 707/5 |
| 2008/0104194 A1* | 5/2008 | Tsun et al. | 709/217 |
| 2008/0140476 A1* | 6/2008 | Anand et al. | 705/7 |
| 2008/0140508 A1* | 6/2008 | Anand et al. | 705/10 |
| 2008/0162709 A1* | 7/2008 | Hrischuk et al. | 709/230 |
| 2009/0030859 A1* | 1/2009 | Buchs et al. | 706/19 |
| 2009/0172171 A1* | 7/2009 | Amir | 709/227 |
| 2009/0232130 A1* | 9/2009 | Philavong | 370/352 |

OTHER PUBLICATIONS

Session-based overload control in QoS-aware Web servers Huamin Chen; Mohapatra, P. INFOCOM 2002. Twenty-First Annual Joint Conference of the IEEE Computer and Communications Societies. Proceedings. IEEE vol. 2 , Digital Object Identifier: 10.1109/INFCOM.2002.1019296 Publication Year: 2002 , pp. 516-524 vol. 2.*

* cited by examiner

FIG. 19 EVALUATION RESULT STORAGE UNIT 72

| REFERENCE PAGE CANDIDATE | DISPERSION VALUE |
|---|---|
| Home | 8 |
| Search Product | 3 |
| Best Seller | 2 |
| New Products | 5 |
| Product Detail | 1 |
| Shopping Cart | 10 |
| User Login | 7 |
| Buy Confirm | 8 |

SESSION CONTROL SYSTEM, SESSION CONTROL METHOD AND SESSION CONTROL PROGRAM

REFERENCE TO RELATED APPLICATION

This is a divisional application of U.S. patent application Ser. No. 12/665,797 filed Dec. 21, 2009 now U.S. Pat. No. 8,291,080 and claims the benefit of its priority.

TECHNICAL FIELD

The present invention relates to a session control system, a session control method and a session control program and, more particularly, to a session control system, a session control method and a session control program which enable profits of a site to be optimized by increasing the number of purchase processings when load on an E-commerce site is increased.

BACKGROUND ART

At E-commerce sites, a user executes a request sequence called session. Access to the E-commerce sites is made not only by a user who executes purchase processing but also by a user who executes browsing of new products, check of best-sellers, price comparison and the like. According to a request, a wide variety of processing is executed such as product search, cart processing, user registration•log-in, a shipping procedure and confirmation of purchase. Session here may be called as transaction in some cases.

E-commerce sites have a tendency of access avalanche in a specific time zone such as a weekend or a holiday. When rushing accesses exceed an allowance of a system of the site, there occurs a situation that responsiveness of the site will be sharply degraded or that the site becomes inaccessible. Sites incapability of handling an increasing number of user accesses satisfactorily results in losing a business chance.

As a method of preventing such situations as described above, for example, non-Patent Literature 1 discloses two methods shown in the following.

(a) To make a system structure have tolerance for an increase in the number of access.

(b) To dynamically change a structure of the system when the number of accesses is increased.

The method (a) has a problem that when access avalanche is temporary, most of servers forming the system will become idle servers, so that it is not a method effective in investment.

The method (b) is a method attaining effective use of servers by borrowing and lending servers with each other under an environment where a server is shared by other system when accesses avalanche to any of the systems. When the system is not designed to allow structure change with ease or when structure change requires a long period of time, however, it is difficult to cope with access avalanche by (b).

In a case where excessive investment to the system is impossible or where system structure change is not easy as described above, often adopted is a method of controlling a session. Although by limiting the number of sessions acceptable at the same time to a fixed number, system down is avoided to enable responsiveness to be maintained, a part of sessions should be rejected.

Examples of such a session control system are recited in Patent Literature 1 and non-Patent Literature 2.

The session control system in Patent Literature 1 is formed of a data base for storing an ID and a rank of a user, an information provision request accepting unit for accepting a provision request from a user's terminal through a network, a user specifying unit for referring to a rank corresponding to a user's ID included in an information provision request from the data base, a load monitoring unit for monitoring a web site load condition, and an information generating unit for generating information to be provided to a user according a rank of the user and a system load condition.

The information generating unit obtains a rank corresponding to an ID of a user from the data base, generates information to be provided to the user according to the rank and a load condition of a web site and transmits the information to a terminal. The rank is determined by a user's record of commercial transaction or the like.

Session control recited in Patent Literature 1 enables commercial transaction by a user having a strong possibility of producing profits to be continued by rejecting a session of a user whose rank is low when a system load is heavy. When ranking of a user is impossible or when there exist many users of the same rank, however, it is difficult to execute such session control as enables a web site load to be suppressed and profits to be increased.

The session control system disclosed in Non-Patent Literature 2 is formed of a session control unit for accepting or rejecting a newly connected session, a stage classification unit for classifying sessions into stages each indicative of a state of a session, a queue in which a classified session waits for its execution and a scheduling unit for taking out a session from the queue and executing the same on the web site.

The scheduling unit schedules a session waiting in the queue to make a profit of the web site be the highest. Rejection of a session by the system is executed only when a new session is set up. When priority of a session whose connection is allowed lowers, a response time becomes long, so that a session of a user who cannot wait longer is cut off. The longer a user waits for a response, the more dissatisfied he/she becomes.

On the other hand, in the system recited in Non-Patent Literature 2, scheduling of a request of a session belonging to the same stage is the same. Therefore, it is impossible to control a session continuing requesting without shifting a stage. More specifically, it will be difficult to reject such a session as continues browsing products without putting a product into a shopping cart.

Patent Literature 1: Japanese Patent Laying-Open No. 2006-065563.

Non-Patent Literature 1: Shinya Miyakawa, Nobuyuki Saji, Yutaka Kudo and Hideaki Tazaki, Business Grid Computing: 2. Technology Focus of Business Grid Middleware, Journal of Information Processing Society of Japan, Vol. 47, No. 9, p. 953-p. 961, September 2006.

Non-Patent Literature 2: Jakob Carlstrom, Raphael Rom, Application-Aware Admission Control and Scheduling in Web Servers, INFOCOM 2002.

First problem is that when accesses avalanche to a web site, the number of arrivals at processing whose importance is high such as purchase processing hits the top.

The reason is that when a web site is incapable of executing such discrimination of users as ranking, session control on a rank basis is impossible.

Another reason is a lack of an index for rejecting a session which fails to reach such processing as purchase processing whose importance is high, so called a stagnant session.

Second problem is that when accesses avalanche to a web site, user's dissatisfaction is increased.

The reason is that a session of a user whose priority is low with a weak desire for processing of high importance at a web site is not immediately rejected and continued after a long response time.

OBJECT OF THE INVENTION

An object of the present invention is to provide a session control device, a session control method and a session control program which enable profits of a web site to be optimized when accesses avalanche to the web site.

Another object of the present invention is to provide a session control device, a session control method and a session control program which enable it to control low a possibility that an access of a user who desires very important processing at a web site is rejected when accesses avalanche to the web site.

SUMMARY

According to an exemplary aspect of the invention, a session control device connected to a web site and a client terminal which accesses the web site through a network, includes a calculation unit for calculating, with a state of a session in each access to a reference page which is a page whose effect is large on arrival at processing whose importance in the web site is high as a stage, a tendency of a session toward the processing whose importance is high on the stage basis, a storage unit for storing a calculated tendency toward the processing whose importance is high, a setting unit for setting a reference for limiting the session, and a collation unit for obtaining, from the storage unit, a tendency toward the processing whose importance is high with respect to a stage of the session received from the client terminal and comparing the tendency with the reference to determine whether to limit the session from the client terminal.

According to an exemplary aspect of the invention, a session control method by a session control device connected to a web site and a client terminal which accesses the web site through a network, includes the steps of calculating, with a state of a session in each access to a reference page which is a page whose effect is large on arrival at processing whose importance in the web site is high as a stage, a tendency of a session toward the processing whose importance is high on the stage basis, storing a calculated tendency toward the processing whose importance is high, setting a reference for limiting the session, and obtaining, from the storage unit, a tendency toward the processing whose importance is high with respect to a stage of the session received from the client terminal and comparing the tendency with the reference to determine whether to limit the session from the client terminal.

According to an exemplary aspect of the invention, a session control program executed on a computer connected to a web site and a client terminal which accesses the web site through a network, which causes the computer to execute the processing of calculating, with a state of a session in each access to a reference page which is a page whose effect is large on arrival at processing whose importance in the web site is high as a stage, a tendency of a session toward the processing whose importance is high on the stage basis, storing a calculated tendency toward the processing whose importance is high, setting a reference for limiting the session, and obtaining, from the storage unit, a tendency toward the processing whose importance is high with respect to a stage of the session received from the client terminal and comparing the tendency with the reference to determine whether to limit the session from the client terminal.

First effect is to optimize profits of a web site when accesses avalanche to the web site.

Second effect is to suppress user's dissatisfaction by decreasing a possibility that an access of a user having a strong desire for processing whose importance is high will be rejected.

The reason is that when a site load is increased, a session of a user having a weak desire for processing whose importance is high is rejected and accordingly more sessions of users having a strong desire for processing whose importance is high are maintained.

BRIEF DESCRIPTION OF THE DRAWINGS

FIG. 19 is a diagram showing an example of an evaluation result of a reference page candidate according to the fourth exemplary embodiment of the present invention;

EXEMPLARY EMBODIMENT

Next, exemplary embodiments of the present invention will be detailed with reference to the drawings.

In each exemplary embodiment to follow, description will be made of a case where the present invention is applied to an E-commerce (electronic commerce) site as a web site.

First Exemplary Embodiment

Figure 1:
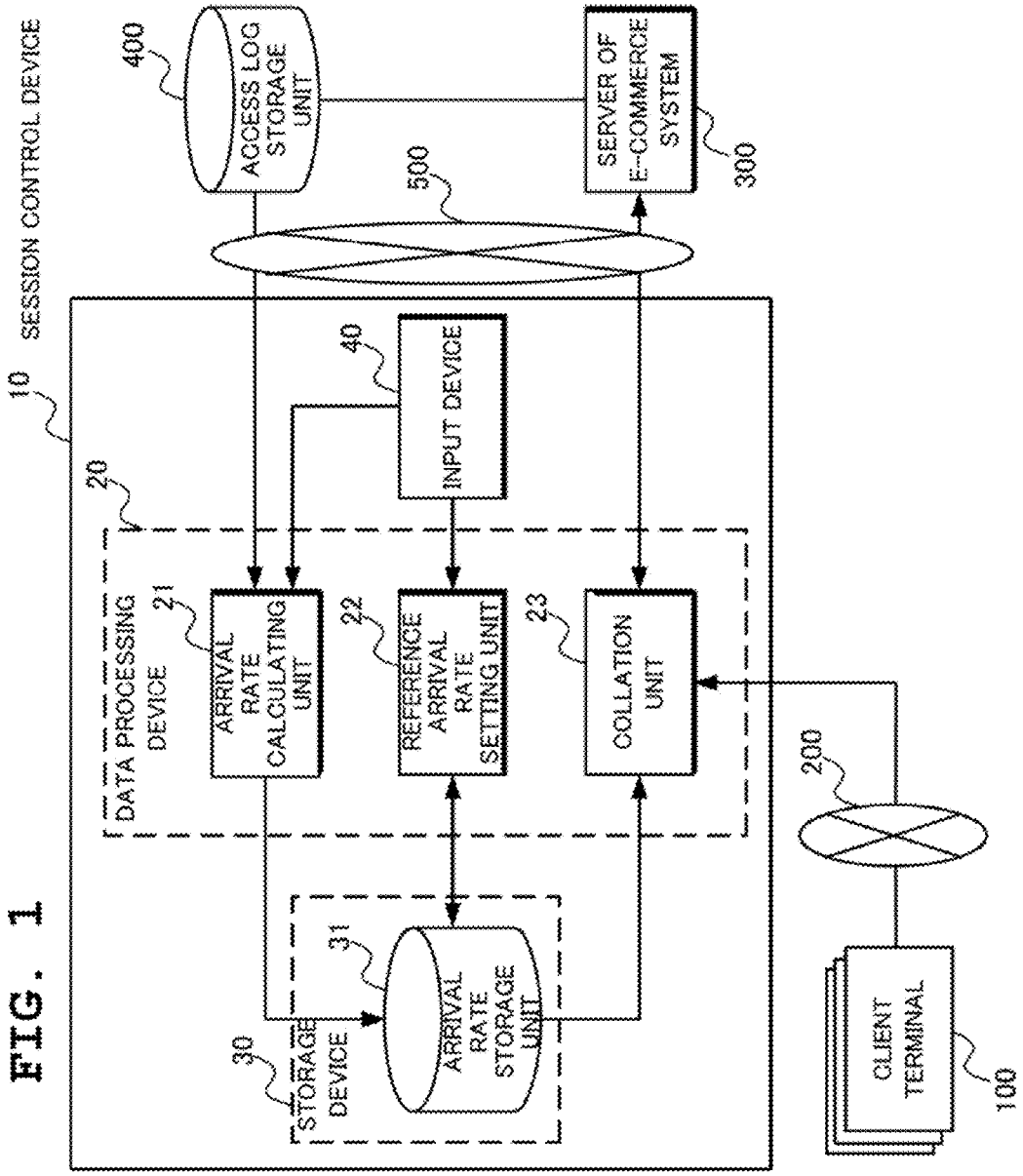
FIG. 1 is a block diagram showing a structure of a session control device according to a first exemplary embodiment of the present invention.

With reference to FIG. 1, a session control device 10 according to the first exemplary embodiment of the present invention includes an input device 40 such as a keyboard, a data processing device 20 operable under the control of a program and a storage device 30 for storing information.

A client terminal 100 on which a browser used by a user or the like is operating is connected to the session control device 10 through a network 200 such as the Internet. A server 300 of an E-commerce (electronic transaction) system and an access log storage unit 400 in which a history of requests accessed to the server 300 of the E-commerce system is recorded are connected to the session control device 10 through a network 500 such as an intranet.

The data processing device 20 comprises an arrival rate calculating unit 21, a reference arrival rate setting unit 22 and a collation unit 23.

The arrival rate calculating unit 21 reads a request history on a session basis from the access log storage unit 400 in which a history of requests to the E-commerce system is recorded and with a request history sectioned on a basis of each request for a reference page of a session as a stage, calculates a probability of arrival (arrival rate) of a certain session to purchase processing as processing whose importance is high on a stage basis and stores the same in the arrival rate storage unit 31.

When a web site is an E-commerce (electronic transaction) site, purchase processing is relevant to processing whose importance is high, while with respect to other kinds of sites, for example, contracting processing, user registration processing and the like are relevant to processing whose importance is high.

Reference page here represents a page which largely affects arrival at the purchase processing in an E-commerce system. It is, for example, a page which increases a probability of arrival at the purchase processing by the passage of the page itself among pages of the E-commerce system, and as will be described later, among relevant pages is a page for executing cart processing which is the processing of putting a product selected for buying into a cart.

On the contrary, it may be a page which decreases a probability of arrival at the purchase processing by the passage of the page itself. For example, a page in which evaluation related to a product and the like is written, so-called a page of a word-of-mouth which largely affects arrival at the purchase processing can be a reference page in a sense that it has a low probability of arrival at the purchase processing and the like.

Figure 4:
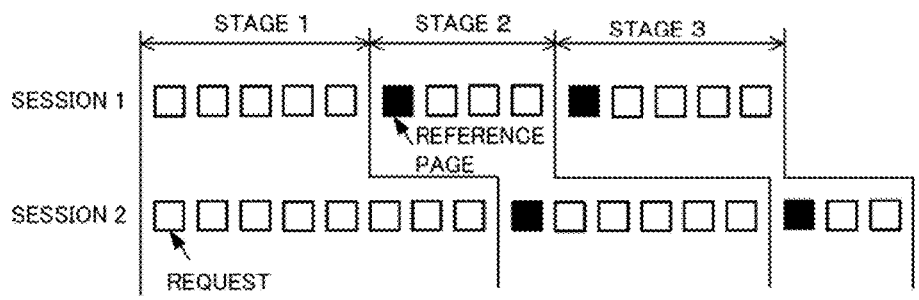
FIG. 4 is a diagram for use in explaining a relationship between a session and a stage according to the first exemplary embodiment of the present invention.

With reference to FIG. 4, description will be made of a relationship between a session and a stage. As shown in FIG. 4, a session 1 and a session 2 are each formed of a sequence of requests to the E-commerce system.

In a request sequence of each session, set a sequence from a session starting request until before a first request for a reference page is made as a stage 1 and a sequence from a first request for a reference page until before a second request for a reference page is made as a stage 2. Hereinafter, at every request for a reference page, a stage is set.

In a case, for example, where in a certain session, no request for a reference page is made after starting the session, the session is considered to belong to the first stage 1. After accessing the reference page twice, the session is considered to belong to a stage 3.

The reference arrival rate setting unit 22 receives, from the input device 40, a reference arrival rate as an arrival rate to be a reference for rejecting a session (request) from the client terminal 100 and stores the reference arrival rate on a basis of a stage of each session stored in an arrival rate storage unit 31.

The reference arrival rate is arbitrarily changed according to a kind of E-commerce system, a kind of product handled, time and date and the like and applied to the reference arrival rate setting unit 22 through the input device 40. It is also possible to input a reference arrival rate calculated in a fifth exemplary embodiment which will be described later to the reference arrival rate setting unit 22 through the input device 40.

The collation unit 23 receives a request sequence forming a session from the client terminal 100 and changes a stage to which the session is to belong at every access to a reference page.

The collation unit 23 also refers to an arrival rate on a stage basis stored in the arrival rate storage unit 31 to apply a rate of an arrival at the purchase processing to a session and compares the arrival rate with a reference arrival rate.

When the arrival rate is not less than the reference arrival rate, the collation unit 23 transmits a request from the client terminal 100 to the server 300 of the E-commerce system and transfers a response message returned from the E-commerce system 300 to the client terminal 100.

When the rate of an arrival at the purchase processing which is applied to the session is less than the reference arrival rate, the collation unit 23 transmits a response message notifying rejection of the session to the client terminal 100.

Here, description will be made of a hardware structure of the session control device 10.

Figure 23:
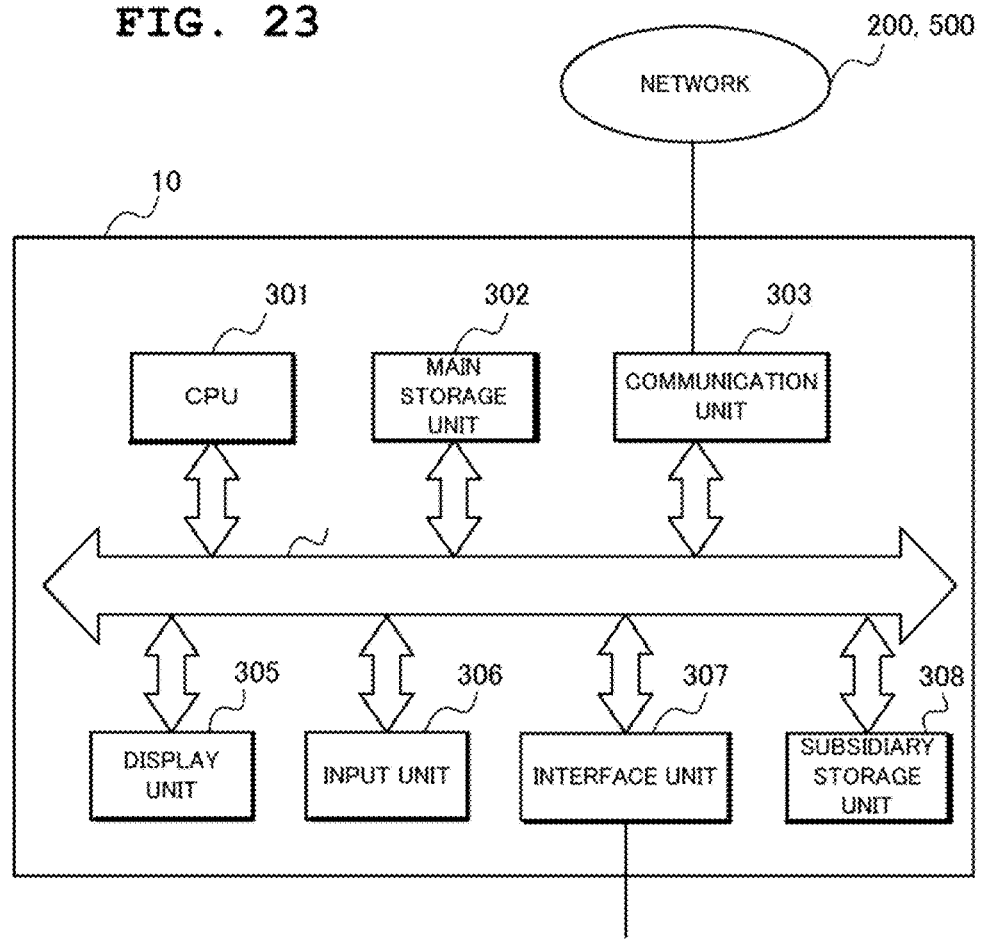
FIG. 23 is a diagram for use in explaining a hardware structure of the session control device according to the present invention.

FIG. 23 is a block diagram showing a hardware structure of the session control device 10 according to the first exemplary embodiment.

With reference to FIG. 23, the session control device 10 according to the present invention, which can be realized by the same hardware structure as that of a common computer device, comprises a CPU (Central Processing Unit) 301, a main storage unit 302 which is a main memory such as RAM (Random Access Memory) for use as a data working region or a data temporary saving region, a communication control unit 303 for transmitting/receiving data through the networks 200 and 500, a display unit 305 such as a liquid crystal display, a printer or a speaker, an input unit 306 (input device 40) such as a keyboard or a mouse, an interface unit 307 connected to a peripheral apparatus for transmitting/receiving data through a firewall 50, a subsidiary storage unit 308 (storage device 30) as a hard disk device formed of a non-volatile memory such as a ROM (Read Only Memory), a magnetic disk or a semiconductor memory, and a system bus for connecting the above-described respective components with each other.

The session control device 10 according to the present invention can be realized not only in hardware by mounting a circuit part formed of a hardware part such as an LSI (Large Scale Integration) which has a program realizing such functions incorporated into the session control device 10 but also in software by executing a program which provides each function of each of the above-described components by the CPU 301 on the computer processing device.

More specifically, the CPU 301 loads a program (session control program) stored in the subsidiary storage unit 307 into the main storage device 302 and executes the same to control operation of the session control device 10, thereby realizing each of the above-described functions in software.

Session control devices according to second through fifth exemplary embodiments which will be described later also have the hardware structure shown in FIG. 23 and have their functions realized in hardware or software.

Figure 2:
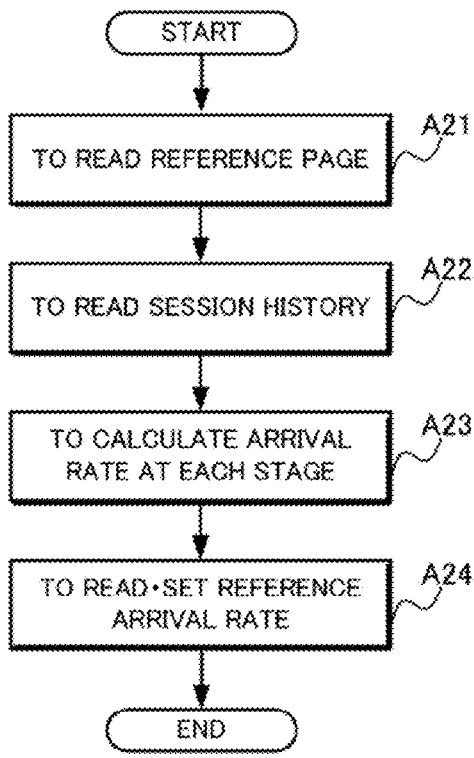
FIG. 2 is a flow chart showing operation of setting an arrival rate and a reference arrival rate according to the first exemplary embodiment of the present invention.
Figure 3:
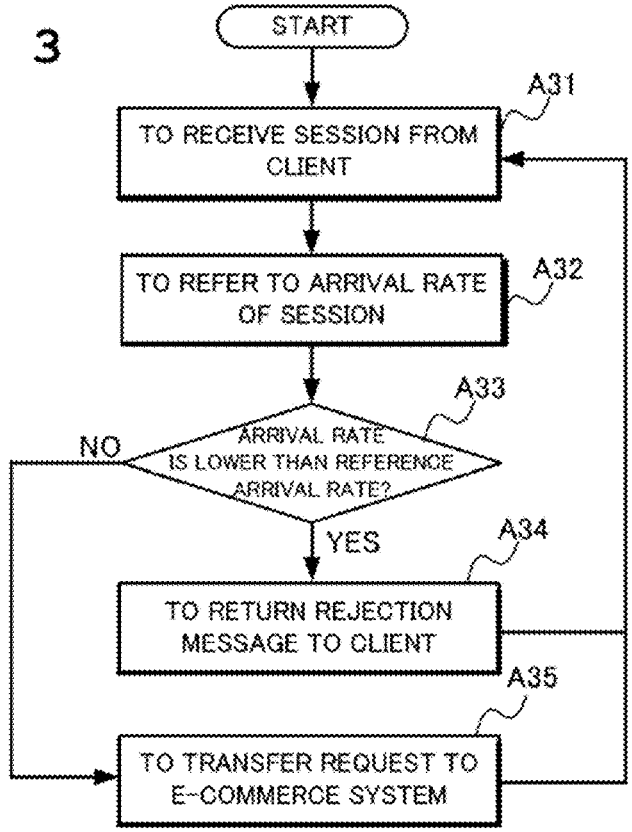
FIG. 3 is a flow chart showing operation of controlling a session according to the first exemplary embodiment of the present invention.

Next, detailed description will be made of operation of the session control device 10 according to the first exemplary embodiment with reference to FIG. 1 and the flow charts in FIG. 2 and FIG. 3.

First, with reference to FIG. 2, description will be made of operation of setting a rate of arrival at purchase processing of a session and a reference arrival rate executed by the session control device 10 according to the first exemplary embodiment.

First, read a reference page from the input device 40 and transfer the same to the arrival rate calculating unit 21 (Step S21). Next, read a request history from the access log storage unit 400 on a session basis (Step A22).

The arrival rate calculating unit 21 calculates a rate of arrival at the purchase processing of a session arriving at each stage and stores the calculated arrival rate in the arrival rate storage unit 31 (Step A23).

Next, the reference arrival rate setting unit 22 receives, from the input device 40, a reference arrival rate determined and set from a degree of avalanche of requests to the server 300 of the E-commerce system and stores the rate in each stage of the arrival rate storage unit 31 (Step A24).

Next, with reference to FIG. 3, description will be made of operation of controlling a session received from the client terminal 100 which is executed by the session control device 10 according to the first exemplary embodiment.

The collation unit 23 receives a session from the client terminal 100 (Step A31). Based on a stage to which the received session belongs, obtain a rate of arrival at the purchase processing stored in the arrival rate storage unit 31 (Step A32).

Next, compare the rate of arrival at the purchase processing obtained at Step A32 and a reference arrival rate (Step A33). When the arrival rate is lower than the reference arrival rate, return a message indicating that a request is rejected to the client terminal 100 (Step A34).

At Step A33, when the rate of arrival at the purchase processing is not less than the reference arrival rate, transfer the request from the client terminal 100 to the server 300 of the E-commerce system and return the result of the same to the client terminal 100 (Step A35).

(Mode of Implementation)

Next, a mode of implementation of the first exemplary embodiment will be described.

In the present mode of implementation, assume that a page of "Daily News" indicative of a news article page is designated as a reference page by the input device 40.

Figure 5:
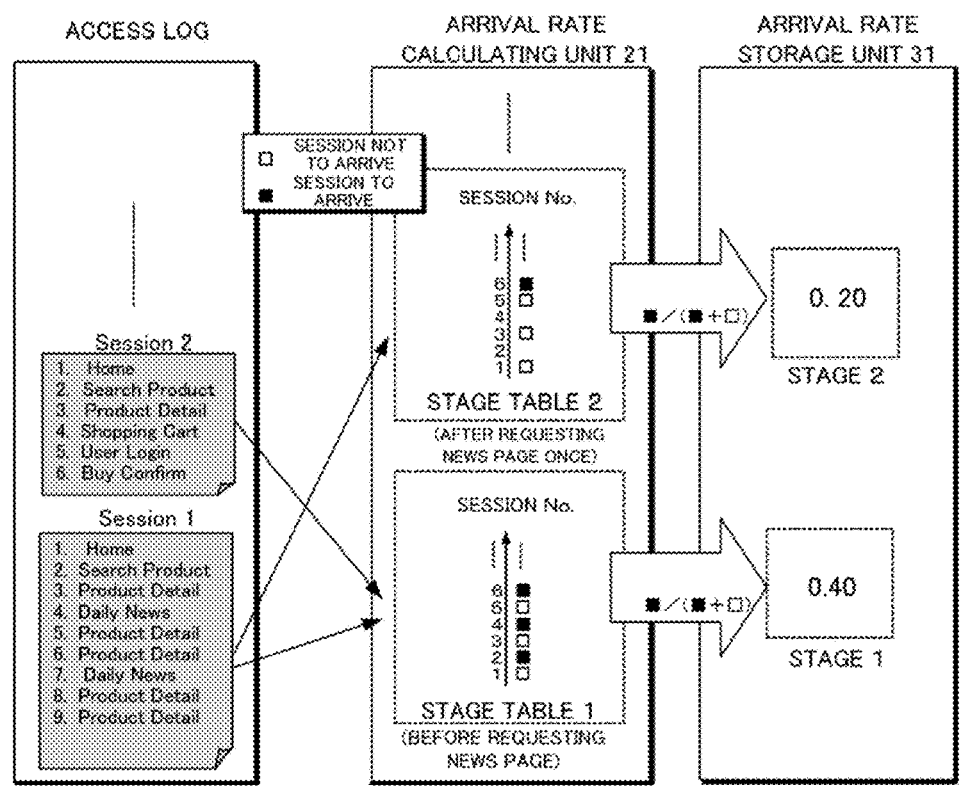
FIG. 5 is a diagram showing a mode of implementation according to the first exemplary embodiment of the present invention.

The arrival rate calculating unit 21 creates such a stage table (stage table 1, stage table 2, . . . ) as shown in FIG. 5 with respect to each of cases, before the "Daily News" page is requested, when the "Daily News" page is requested once, when the "Daily News" page is requested twice, . . . when the "Daily News" page is requested N times.

In the access log storage unit 400, request sequences are sequentially stored on a session basis as illustrated in "access log" in FIG. 5.

The arrival rate calculating unit 21 reads a request sequence on a session basis from the "access log" and writes a history indicative of reaching a relevant stage every time the reference page is requested. When the session is a session yet to arrive at the purchase processing "Buy Confirm", write □ as a history in the stage and when the session is an arrival session that reaches the purchase processing, write ■ as a history in the stage.

For approximating an arrival rate to be obtained later to a precise value, it is desirable to execute the same processing with respect to as many sessions as possible which are recorded in the access log storage unit 400.

Next, the arrival rate calculating unit 21 calculates a ratio of arrival sessions on a stage basis (i.e. arrival sessions/(arrival sessions+sessions yet to arrive), in the example shown in FIG. 5, ■/(■+□)) and stores the same as an arrival rate at each stage in the arrival rate storage unit 31.

Next, upon receiving the reference arrival rate set in consideration of a load condition of the E-commerce system 300 from the input device 40, the reference arrival rate setting unit 22 stores the reference arrival rate for each stage stored in the arrival rate storage unit 31.

Figure 6:
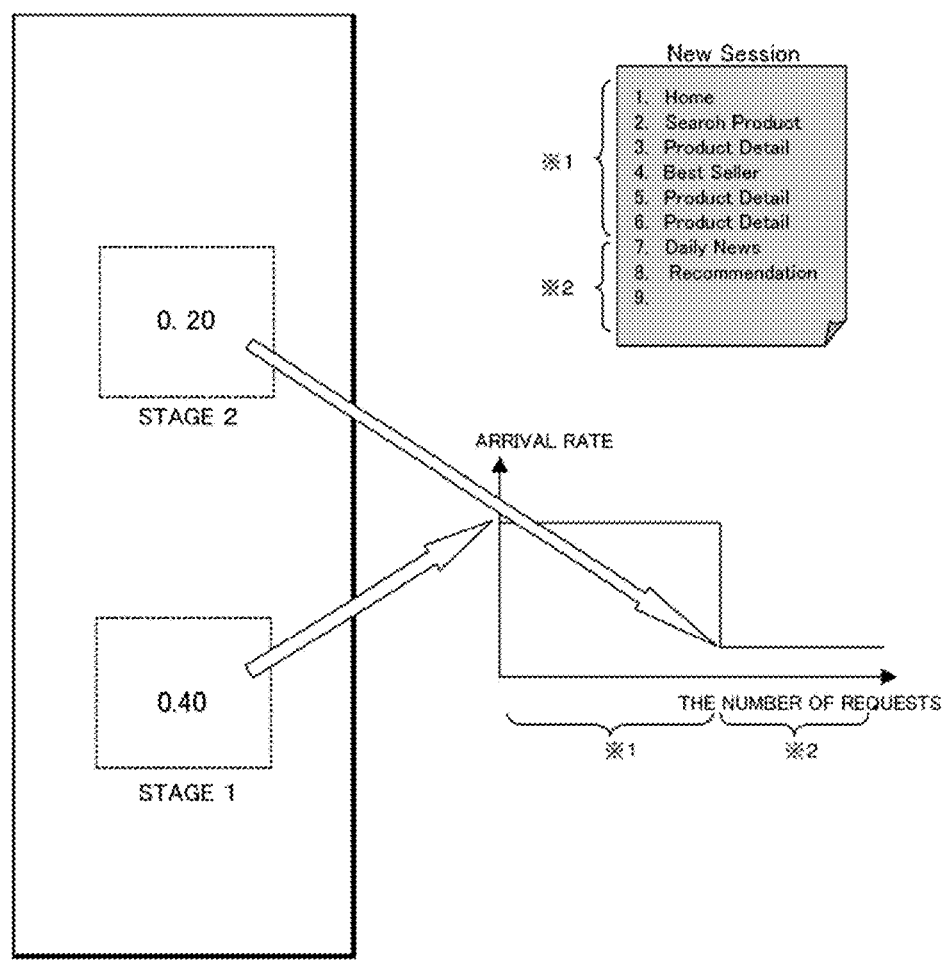
FIG. 6 is a diagram showing the mode of implementation according to the first exemplary embodiment of the present invention.

Next, the collation unit 23 receives a session from the client terminal 100 and obtains as shown in FIG. 6 an arrival rate of the session from the arrival rate storage unit 31. First, count the number of requests for the "Daily News" page of the session and before requesting the "Daily News" page, obtain an arrival rate of the stage 1 from the arrival rate storage unit 31 (□1 in FIG. 6).

When a request for the "Daily News" page is made once, obtain the arrival rate of the stage 2 from the arrival rate storage unit 31 (□2 in FIG. 6).

Then, when the arrival rate is lower than the reference arrival rate, return a message indicative of the rejection of the request to the client terminal 100. When the arrival rate is not less than the reference arrival rate, transfer the request from the client terminal 100 to the E-commerce system 300 and return the result of the same to the client terminal 100.

In the mode of implementation shown in FIGS. 5 and 6, as to a session which continues requesting the "Daily News" page, it is highly probable that the session is rejected halfway considering that it has no desire for purchase.

On the other hand, as to a session which makes fewer requests for the "Daily News" page, it is less probable that the session is rejected considering it has an item of purchase fixed and has a desire for purchase.

Effects of the First Exemplary Embodiment

Since the first exemplary embodiment is structured to derive an arrival rate on a stage basis from a history of requests for a reference page, arrival rates varying with a request pattern of a session can be obtained.

In addition, since it is structured to input only a page whose effect on an arrival rate is large as a reference page, an arrival rate of each session can be differentiated by a less number of stages.

Moreover, since an arrival rate is calculated for each E-commerce system 300, the present exemplary embodiment attains an appropriate arrival rate meeting an access tendency varying with each E-commerce system 300.

Second Exemplary Embodiment

Next, a second exemplary embodiment will be detailed with reference to the drawings.

Figure 7:
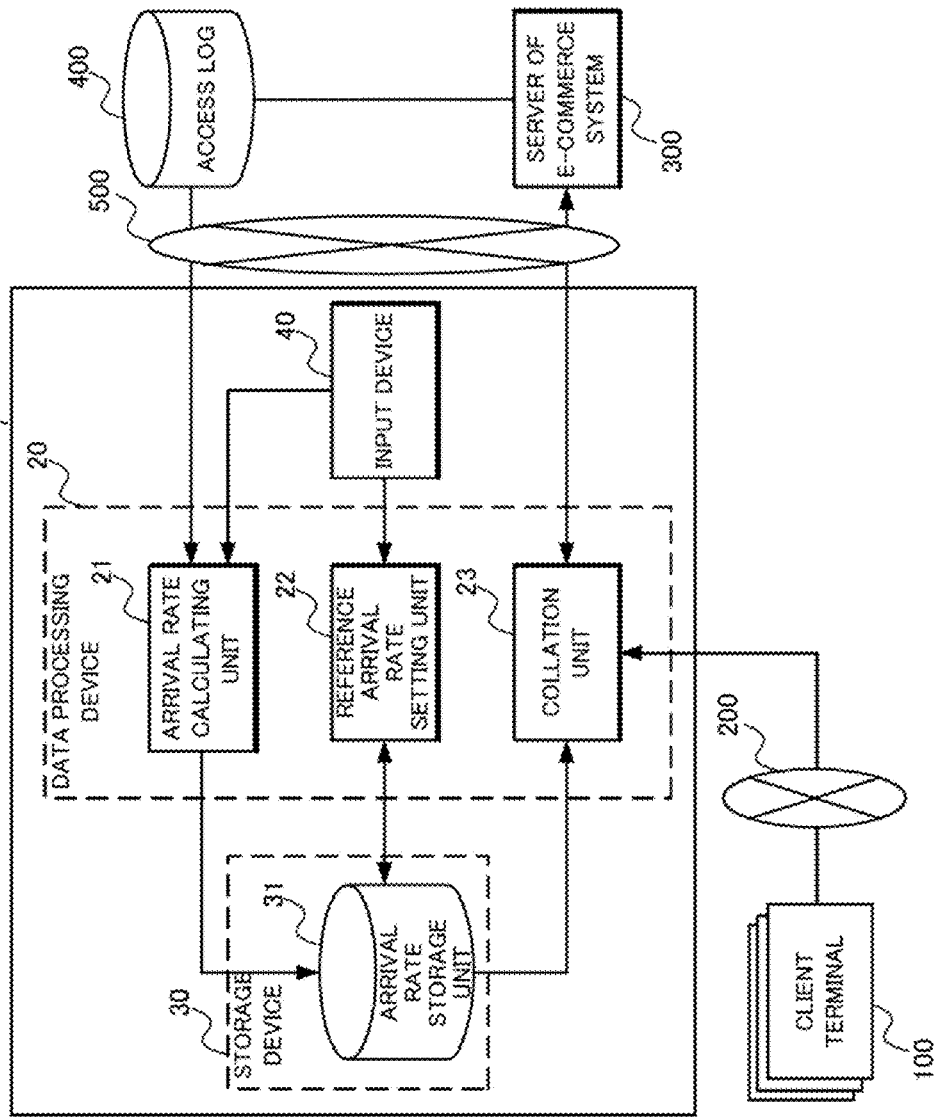
FIG. 7 is a block diagram showing a structure of a session control device according to a second exemplary embodiment of the present invention.

With reference to FIG. 7, the session control device 10 according to the second exemplary embodiment of the present invention includes the input device 40 such as a keyboard, the data processing device 20 operable under the control of a program and the storage device 30 for storing information.

The client terminal 100 on which a browser used by a user or the like is operating is connected to the session control device 10 through the network 200 such as the Internet. The server 300 of an E-commerce (electronic transaction) system and the access log storage unit 400 in which a history of requests accessed to the server 300 of the E-commerce system is recorded are connected to the session control device 10 through the network 500 such as an intranet.

The data processing device 20 comprises the arrival rate calculating unit 21, the reference arrival rate setting unit 22 and the collation unit 23.

The arrival rate calculating unit 21 refers to the access log storage unit 400 in which a history of requests to the E-commerce system is recorded and with a request history sectioned on a basis of each request for a reference page (page whose effect on arrival at the purchase processing is large) of a session as a stage, calculates a probability of arrival (arrival rate) of a session at the purchase processing for each number of requests at each stage and stores the same in the arrival rate storage unit 31. As to a reference page and a stage, they are the same as those described in the first exemplary embodiment.

The reference arrival rate setting unit 22 receives, from the input device 40, a reference arrival rate as an arrival rate to be a reference for rejecting a session (request) from the client terminal 100 and stores the reference arrival rate for each number of requests of each session stored in the arrival rate storage unit 31.

The reference arrival rate is arbitrarily changed according to a kind of E-commerce system, a kind of product handled, time and date and the like and applied to the reference arrival rate setting unit 22 through the input device 40. It is also possible to input a reference arrival rate calculated in a fifth exemplary embodiment which will be described later to the reference arrival rate setting unit 22 through the input device 40.

The collation unit 23 receives a request sequence forming a session from the client terminal 100 and counts the number of requests at each stage while changing a stage to which the session is to belong at every access to a reference page.

The collation unit 23 also refers to an arrival rate on a basis of the number of requests at each stage stored in the arrival rate storage unit 31 to apply a rate of an arrival at the purchase processing to a session and compares the arrival rate with a reference arrival rate.

When the arrival rate is not less than the reference arrival rate, the collation unit 23 transmits a request from the client terminal 100 to the server 300 of the E-commerce system and transfers a response message returned from the E-commerce system 300 to the client terminal 100.

When the rate of an arrival at the purchase processing which is applied to the session is less than the reference arrival rate, the collation unit 23 transmits a response message notifying rejection of the session to the client terminal 100.

Figure 8:
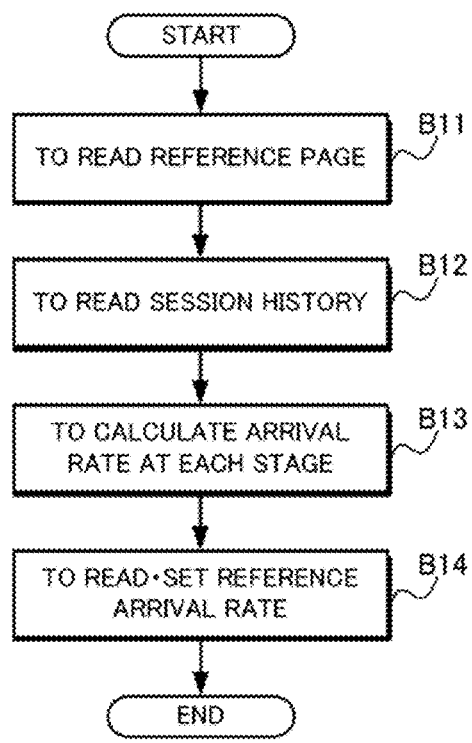
FIG. 8 is a flow chart showing operation of setting an arrival rate and a reference arrival rate according to the second exemplary embodiment of the present invention.
Figure 9:
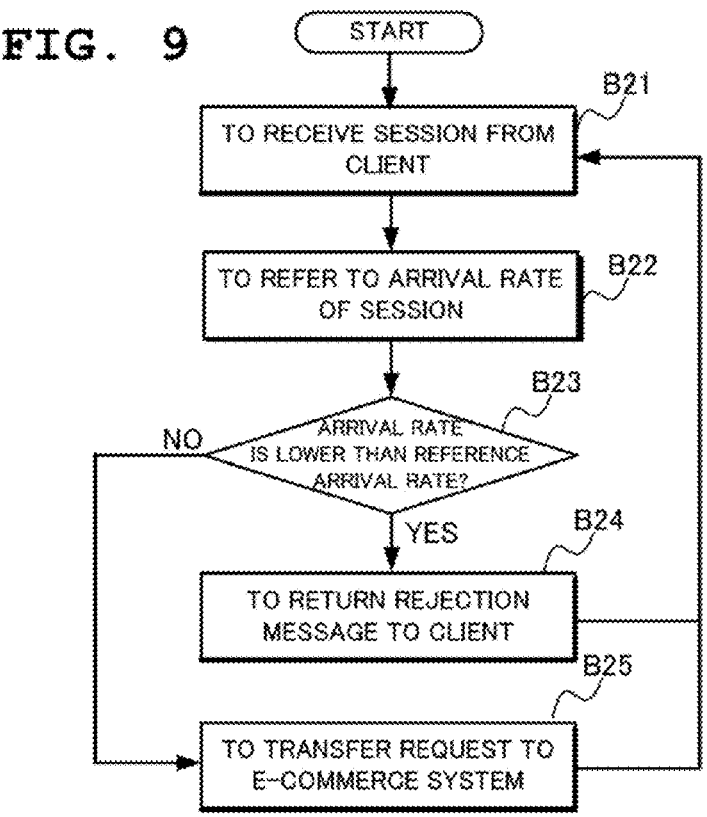
FIG. 9 is a flow chart showing operation of controlling a session according to the second exemplary embodiment of the present invention.

Next, detailed description will be made of operation of the session control device 10 according to the second exemplary embodiment with reference to FIG. 7 and the flow charts in FIG. 8 and FIG. 9.

First, with reference to FIG. 8, description will be made of operation of setting a rate of arrival at purchase processing of a session and a reference arrival rate which is executed by the session control device 10 according to the second exemplary embodiment.

First, read a reference page from the input device 40 and transfer the same to the arrival rate calculating unit 21 (Step B11). Next, read a request history from the access log storage unit 400 on a session basis (Step B12).

The arrival rate calculating unit 21 calculates a rate of arrival at the purchase processing for each number of requests when a session continues requesting at each stage and stores the calculated arrival rate in the arrival rate storage unit 31 (Step B13).

Next, the reference arrival rate setting unit 22 receives, from the input device 40, a reference arrival rate determined and set from a degree of avalanche of requests to the server 300 of the E-commerce system and stores the rate in each stage of the arrival rate storage unit 31 (Step B14).

Next, with reference to FIG. 9, description will be made of operation of controlling a session received from the client terminal 100 which is executed by the session control device 10 according to the second exemplary embodiment.

First, the collation unit 23 receives a session from the client terminal 100 (Step B21). Based on a stage to which the received session belongs and the number of requests at the stage, refer to a rate of arrival at the purchase processing stored in the arrival rate storage unit 31 (Step B22).

Furthermore, compare the rate of arrival at the purchase processing referred to at Step B22 and a reference arrival rate (Step A23). When the arrival rate is lower than the reference arrival rate, return a message indicating that a request is rejected to the client terminal 100 (Step B24).

At Step B22, when the rate of arrival at the purchase processing is not less than the reference arrival rate, transfer the request from the client terminal 100 to the E-commerce system 300 and return the result of the same to the client terminal 100 (Step B25).

(Mode of Implementation)

Next, a mode of implementation of the second exemplary embodiment will be described.

In the present mode of implementation, assume that a page of "Shopping Cart" indicative of cart processing is designated as a reference page by the input device 40. The arrival rate calculating unit 21 creates such a stage table (stage table 1, stage table 2, . . . ) as shown in FIG. 10 with respect to each of cases, before cart processing is executed, after the cart processing is executed once, after the cart processing is executed twice, . . . after the cart processing is executed N times.

Figure 10:
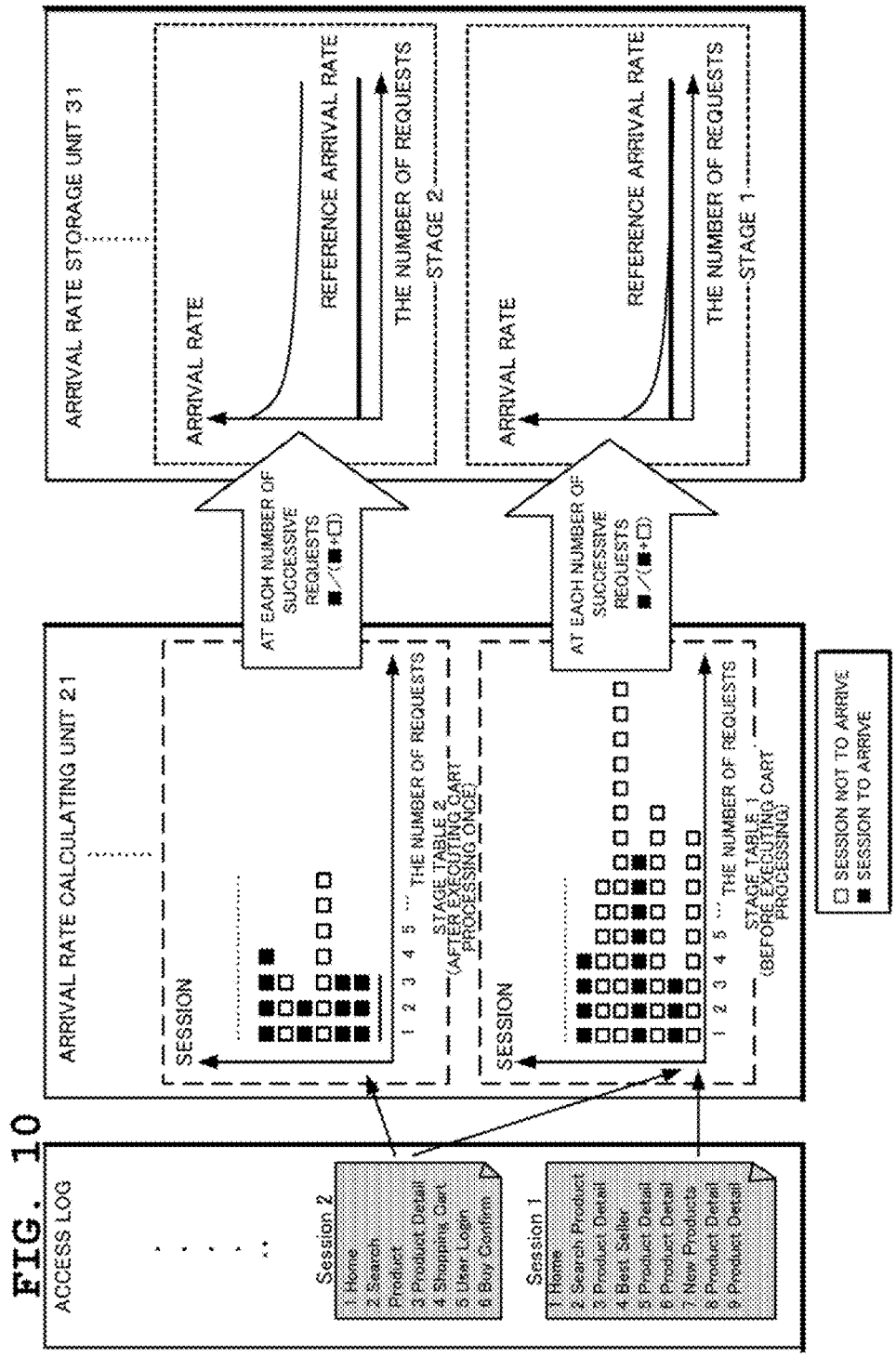
FIG. 10 is a diagram showing a mode of implementation according to the second exemplary embodiment of the present invention.

In the access log storage unit 400, request sequences are sequentially stored on a session basis as illustrated in "access log" in FIG. 10.

The arrival rate calculating unit 21 reads a request sequence on a session basis from the "access log" and sequentially writes a request history in a relevant stage table starting with a first request. When the session is a session yet to arrive at the purchase processing "Buy Confirm", write □ as a history on a basis of each number of requests and when the session is an arrival session that reaches the purchase processing, write ■ as a history on a basis of each number of requests.

For approximating an arrival rate to be obtained later to a precise value, it is desirable to execute the same processing with respect to as many sessions as possible which are recorded in the access log storage unit 400.

Next, the arrival rate calculating unit 21 calculates a ratio of arrival sessions on a basis of a number of requests at each stage (i.e. arrival sessions/(arrival sessions+sessions yet to arrive), in the example shown in FIG. 10, ■/(■+□)) and stores the same as an arrival rate in the arrival rate storage unit 31.

Next, upon receiving the reference arrival rate set in consideration of a load condition of the E-commerce system 300 from the input device 40, the reference arrival rate setting unit 22 stores the reference arrival rate at each stage stored in the arrival rate storage unit 31.

Figure 11:
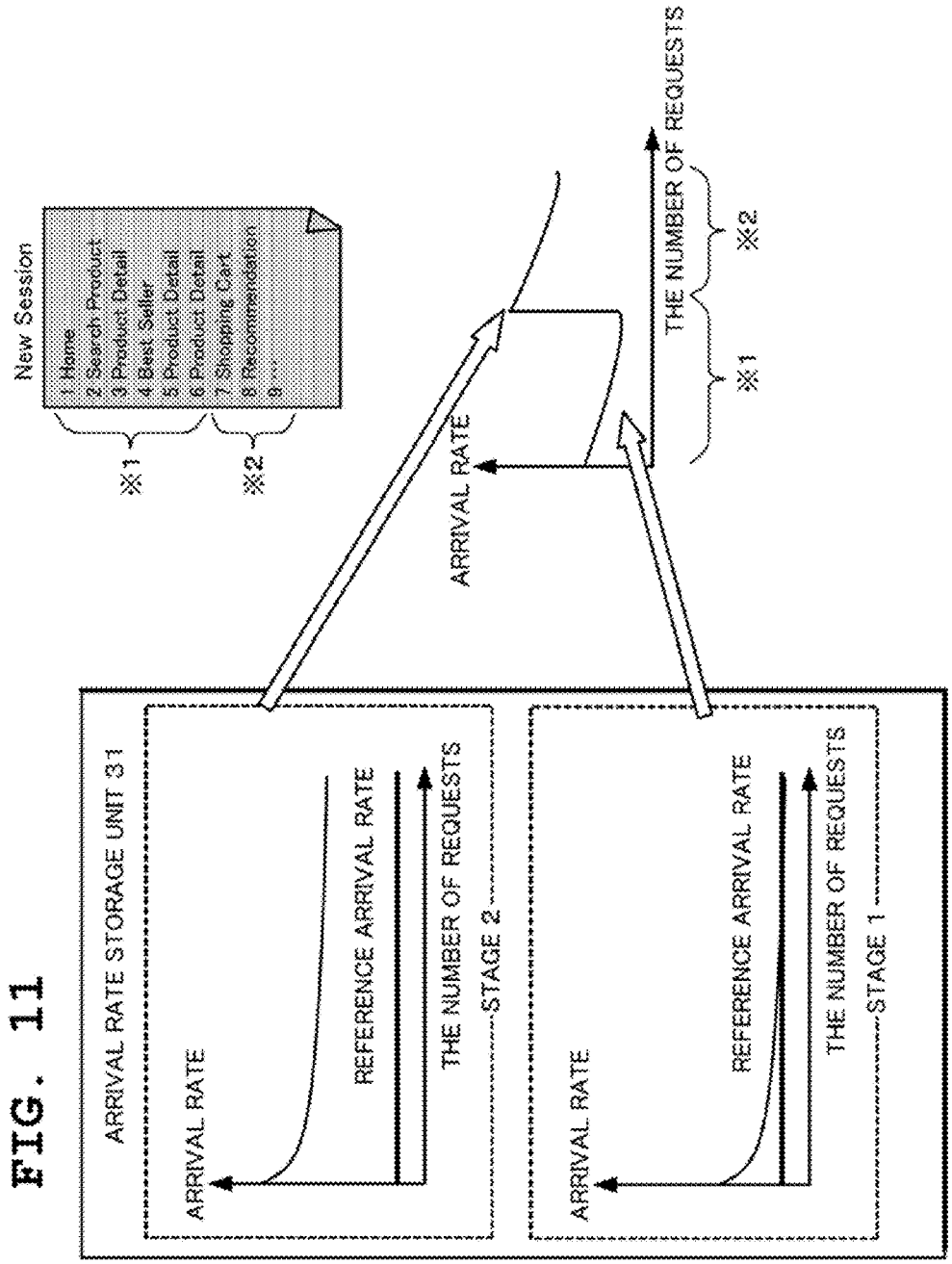
FIG. 11 is a diagram showing the mode of implementation according to the second exemplary embodiment of the present invention.

Next, the collation unit 23 receives a session from the client terminal 100 and obtains as shown in FIG. 11 an arrival rate of the session from the arrival rate storage unit 31. First, count the number of times of the cart processing of the session and before executing the cart processing, refer to and obtain an arrival rate of the stage 1 from the arrival rate storage unit 31 (□1 in FIG. 11).

After executing the cart processing once, obtain an arrival rate of the stage 2 from the arrival rate storage unit 31 (□2 in FIG. 11).

When the arrival rate is lower than the reference arrival rate, return a message indicative of the rejection of the request to the client terminal 100. When the arrival rate is not less than the reference arrival rate, transfer the request from the client terminal 100 to the E-commerce system 300 and return the result of the same to the client terminal 100.

In the mode of implementation shown in FIGS. 10 and 11, as to a session which continues requesting without executing the cart processing even once, it is highly probable that the session is rejected halfway considering that it has no desire for purchase. On the other hand, as to a session executing the cart processing, it is less probable that the session is rejected considering that it has a desire for purchase.

Effects of the Second Exemplary Embodiment

Since the second exemplary embodiment is structured to derive an arrival rate from a history of requests for a reference page, arrival rates varying with a request pattern of a session can be obtained.

In addition, since it is structured to input only a page whose effect on an arrival rate is large as a reference page, an arrival rate of each session can be differentiated by a less number of stages.

Moreover, since an arrival rate is calculated for each E-commerce system 300, the present exemplary embodiment attains an appropriate arrival rate meeting an access tendency varying with each E-commerce system 300.

Third Exemplary Embodiment

Next, a third exemplary embodiment will be detailed with reference to the drawings.

Figure 12:
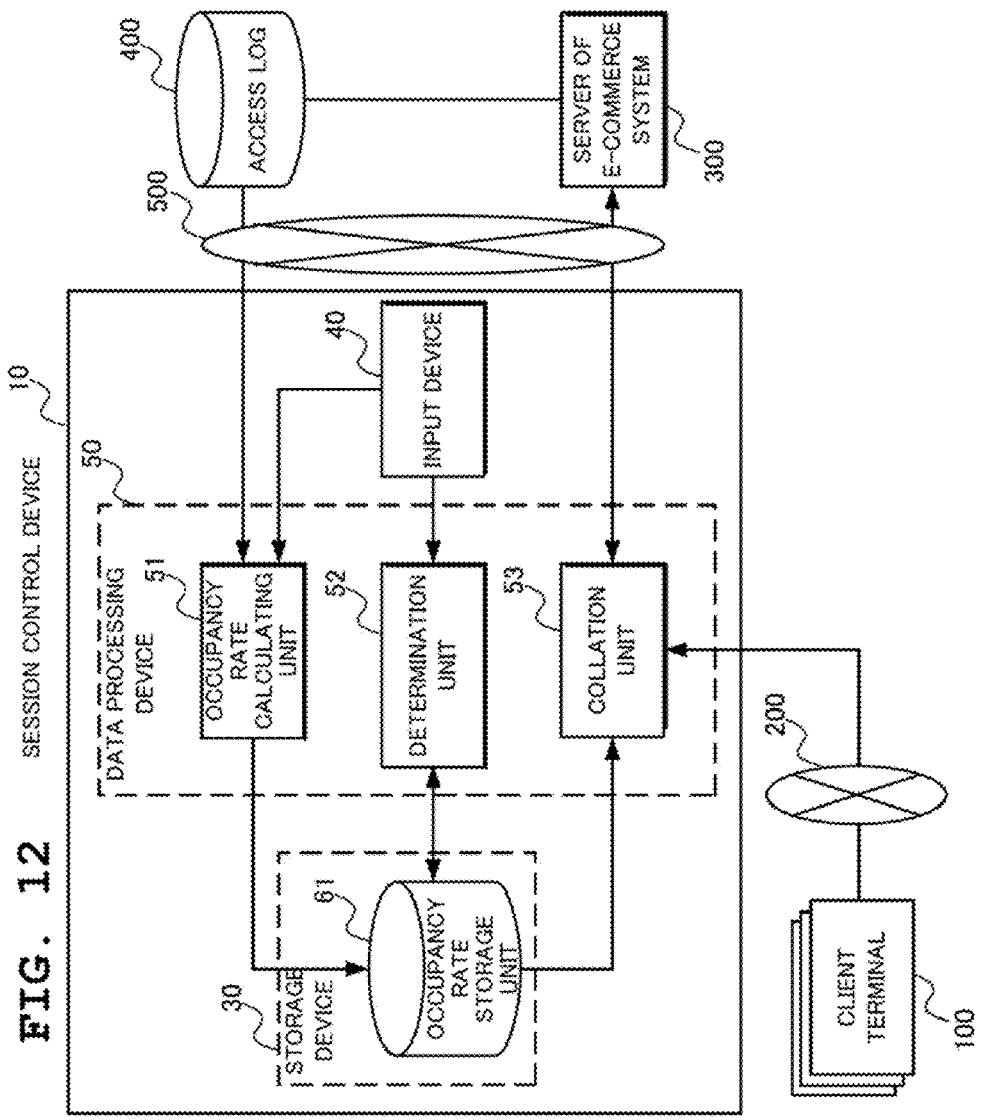
FIG. 12 is a block diagram showing a structure of a session control device according to a third exemplary embodiment of the present invention.

With reference to FIG. 12, the session control device 10 according to the third exemplary embodiment of the present invention includes the input device 40 such as a keyboard, a data processing device 50 operable under the control of a program and the storage device 30 for storing information.

The client terminal 100 on which a browser used by a user or the like is operating is connected to the session control device 10 through the network 200 such as the Internet. The server 300 of an E-commerce (electronic transaction) system and the access log storage unit 400 in which a history of requests accessed to the server 300 of the E-commerce system is recorded are connected to the session control device 10 through the network 500 such as an intranet.

The storage device 30 comprises an occupancy rate storage unit 61.

With the number of successive requests from the start of a stage at each stage until shifting to other stage or until the end of a session without shifting to other stage assumed to be the number of requests, the occupancy rate storage unit 61 stores an occupancy rate (ratio) of stage shifting/ending arrival sessions among all the sessions arriving at the E-commerce site and an occupancy rate (ratio) of stage shifting/ending sessions yet to arrive among all the sessions yet to arrive at the E-commerce site.

The data processing device 50 comprises an occupancy rate calculating unit 51, a determination unit 52, and a collation unit 53.

The occupancy rate calculating unit 51 refers to an access log of the access log storage unit 400 in which a history of requests to the E-commerce system is recorded and analyzes requests on a session basis. More specifically, with a request history sectioned on a basis of a request for a reference page (page whose effect on arrival at the purchase processing is large) of a session as a stage, calculate an occupancy rate of arrival sessions for every number of requests from the start of each stage until shifting to other stage and an occupancy rate of sessions yet to arrive and store the calculated rates in the occupancy rate storage unit 61. As to a reference page and a stage, they are the same as those described in the first exemplary embodiment.

The determination unit 52 receives, from the input device 40, a minimum guaranteed rate indicating that a predetermined rate of sessions among sessions which execute the purchase processing is guaranteed not to be rejected. Next, determine a limited number of requests on a stage basis and store the same in the occupancy rate storage unit 61 such that the largest number of sessions yet to arrive can be rejected within a range where a rate of rejection of arrival sessions is not less than the minimum guaranteed rate.

The collation unit 53 receives a session from the client terminal 100 and counts the number of requests at a stage to which the session belongs and when the number of requests is not more than the limited number stored in the occupancy rate storage unit 61, transfers the request from the client terminal 100 to the server 300 of the E-commerce system and returns the result of the same to the client terminal 100.

When the number of requests exceeds the limited number, the collation unit 53 returns a request rejection message to the client terminal 100 and transfers no request to the E-commerce system 300.

Figure 13:
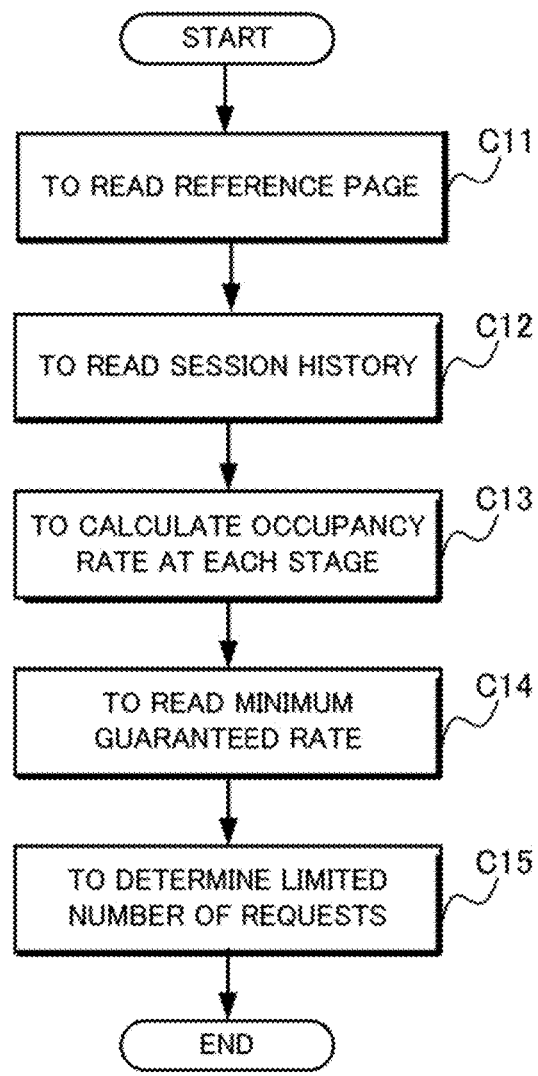
FIG. 13 is a flow chart showing operation of setting an occupancy rate and a limited number of times according to the third exemplary embodiment of the present invention.
Figure 14:
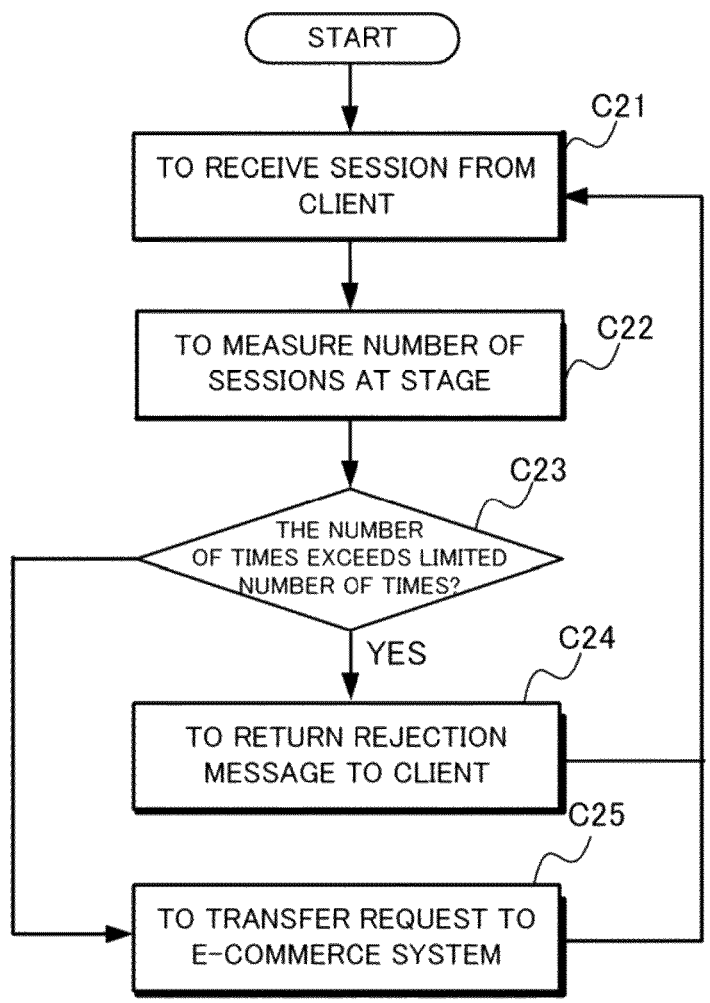
FIG. 14 is a flow chart showing operation of controlling a session according to the third exemplary embodiment of the present invention.

Next, with reference to FIG. 12 and the flow charts of FIG. 13 and FIG. 14, description will be made of operation of the session control device 10 according to the third exemplary embodiment in detail.

First, with reference to FIG. 13, description will be made of operation of setting an occupancy rate and the limited number of sessions which is executed by the session control device 10 according to the third exemplary embodiment.

First, read a reference page from the input device 40 and transfer the same to the occupancy rate calculating unit 51 (Step C11). Next, read a request history from the access log storage unit 400 on a session basis (Step C12).

The occupancy rate calculating unit 51 calculates, at each stage, an occupancy rate of arrival requests on a basis of each number of requests from the start of a stage until shifting to other stage and an occupancy rate of requests yet to arrive and store the same in the occupancy rate storage unit 61 (Step C13).

Based on business policy of the site, from the input device 40, read the minimum guaranteed rate indicating what percentage of sessions of users having a desire for purchase will be guaranteed not to be rejected and transfer the result to the determination unit 52 (Step C14).

The determination unit 52 determines a limited number of requests on a stage basis such that as many sessions yet to arrive can be rejected as possible within a range where a rate of arrival sessions rejected is not less than the minimum guaranteed rate and stores the limited number in the occupancy rate storage unit 61 (Step C15).

Next, with reference to FIG. 14, description will be made of operation of controlling a session received from the client terminal 100 which is executed by the session control device 10 according to the third exemplary embodiment.

The collation unit 53 receives an HTTP request from the client terminal 100 (Step C21) to measure the number of requests at a stage to which the session belongs (Step C22).

Next, determine whether the number of requests exceeds the limited number of times stored in the occupancy rate storage unit 61 (Step C23) and when the number of requests exceeds the limited number, the collation unit 53 returns a request rejection message to the client terminal 100 and refrains from transferring a request to the server 300 of the E-commerce system (Step C24).

When the number of requests fails to exceed the limited number of requests, at Step C23, the collation unit 53 transfers a request from the client terminal 100 to the E-commerce system 300 and returns an execution result obtained by the E-commerce system 300 to the client terminal 100 (Step C25).

(Mode of Implementation)

Next, a mode of implementation of the third exemplary embodiment will be described.

In the present mode of implementation, assume that "Shopping Cart" indicative of cart processing is designated as a reference page by the input device 40. The occupancy rate calculating unit 51 creates such stage tables as shown in FIG. 15, stage table through stage table N, with respect to each of cases, before the cart processing is executed, after the cart processing is executed once, after the cart processing is executed twice, . . . after the cart processing is executed N times.

Figure 15:
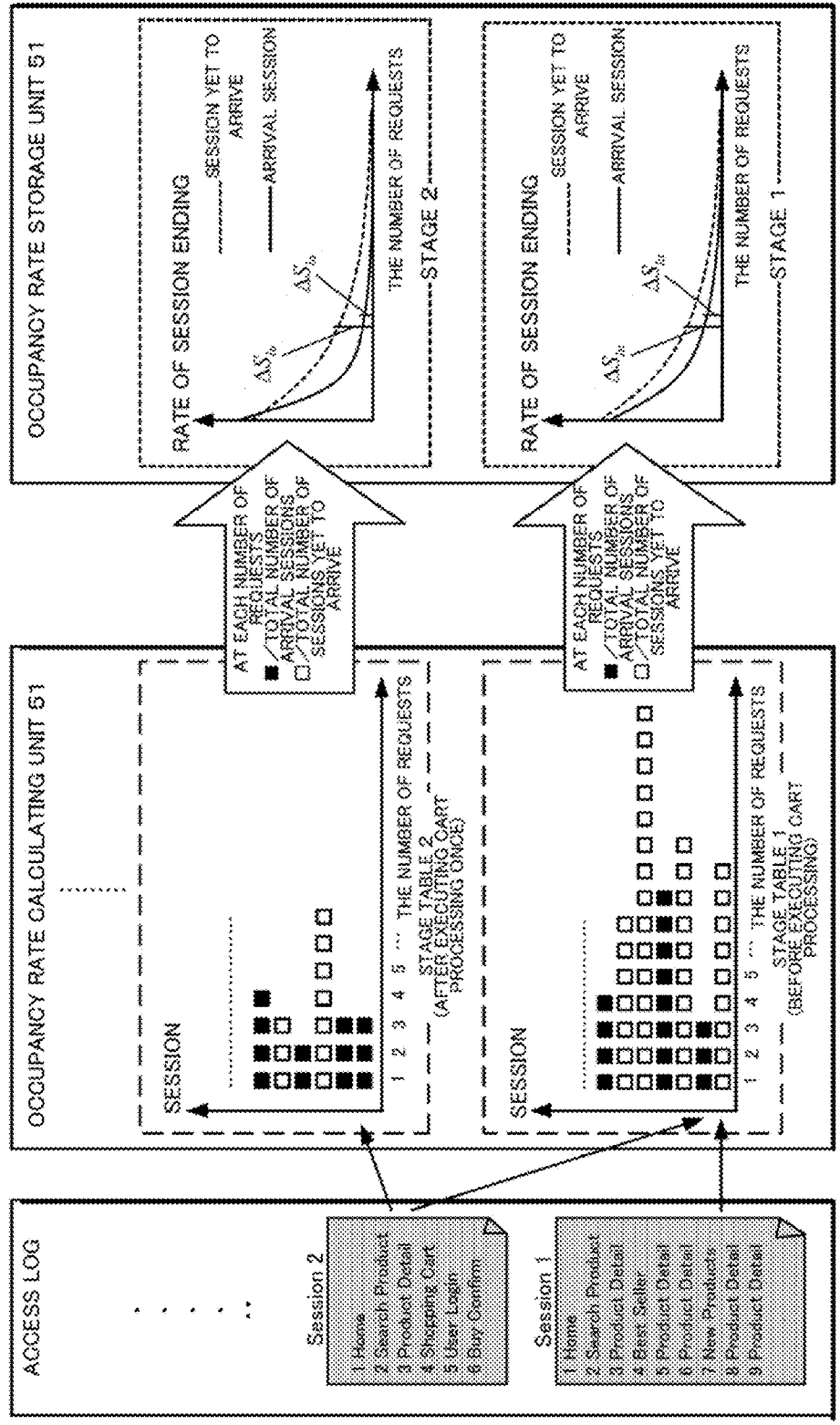
FIG. 15 is a diagram showing a mode of implementation according to the third exemplary embodiment of the present invention.

Assume that in the access log storage unit 400, request sequences are sequentially stored on a session basis as illustrated in "access log" in FIG. 15.

The occupancy rate calculating unit 51 reads a request sequence of a session from the "access log" and sequentially writes a request history in a relevant stage table starting with the first request. When the session is a session yet to arrive at the purchase processing "Buy Confirm", write □ as a history for each number of requests and when the session is an arrival session that reaches the purchase processing, write ■ as a history for each number of requests.

For approximating an arrival rate to be obtained later to a precise value, it is desirable to execute the same processing with respect to as many sessions as possible which are recorded in the access log storage unit 400.

Next, the occupancy rate calculating unit 51 calculates an occupancy rate of arrival sessions on a stage basis to arrival sessions at all the stages (the number of arrival sessions/the total number of arrival sessions, in the example shown in FIG. 15, □/the total number of arrival sessions) and among sessions yet to arrive at all the stages, a rate of sessions yet to arrive on each stage to sessions yet to arrive at all the stages (the number of sessions yet to arrive/the total number of sessions yet to arrive, in the example of FIG. 15, □/the total number of sessions yet to arrive) and stores the same in the occupancy rate storage unit 61.

The determination unit 52 receives, from the input device 40, a minimum guaranteed rate indicating what percentage of sessions executing the purchase processing are guaranteed not to be rejected. Then, at each stage, obtain a rate of an occupancy rate of sessions yet to arrive to an occupancy rate of arrival sessions with respect to each number of requests ($\Delta Siu/\Delta Sia$, i is an identifier indicative of the number of the stage in FIG. 15).

Since the more the number of rejected sessions yet to arrive is, the more will be the number of arrival sessions that can be processed, within a range where a rate of rejected arrival sessions is not less than the minimum guaranteed rate, obtain the number of requests having the largest value of the rate at each stage (difference in occupancy rate is the largest) and determine the number of times which is obtained by slightly reducing the obtained number of requests as the limited number at the relevant stage.

The collation unit 53 receives a session from the client terminal 100 to count the number of requests at a stage of the session. At the stage to which the session belongs, when the number of requests is within the limited number of requests of the stage, transfer the request from the client terminal 100 to the E-commerce system 300 and return the result of the same to the client terminal 100. When the number of requests exceeds the limited number of requests of the stage, return the request rejection message to the client terminal 100 and refrain from transferring the request to the E-commerce system 300.

Effects of the Third Exemplary Embodiment

Since the third exemplary embodiment is structured to statistically derive the number of requests of each stage of an arrival session, a rate of rejected arrival sessions can be suppressed below a designated rate.

In addition, since the present exemplary embodiment is structured to statistically derive the number of requests of each stage of a session yet to arrive as well, a rate of rejection of sessions yet to arrive can be increased when rejecting a session.

Moreover, since an occupancy rate is calculated for each E-commerce system, the present exemplary embodiment attains an appropriate occupancy rate meeting an access tendency varying with each E-commerce system.

Fourth Exemplary Embodiment

Next, a fourth exemplary embodiment of the present invention will be detailed with reference to the drawings.

Figure 16:
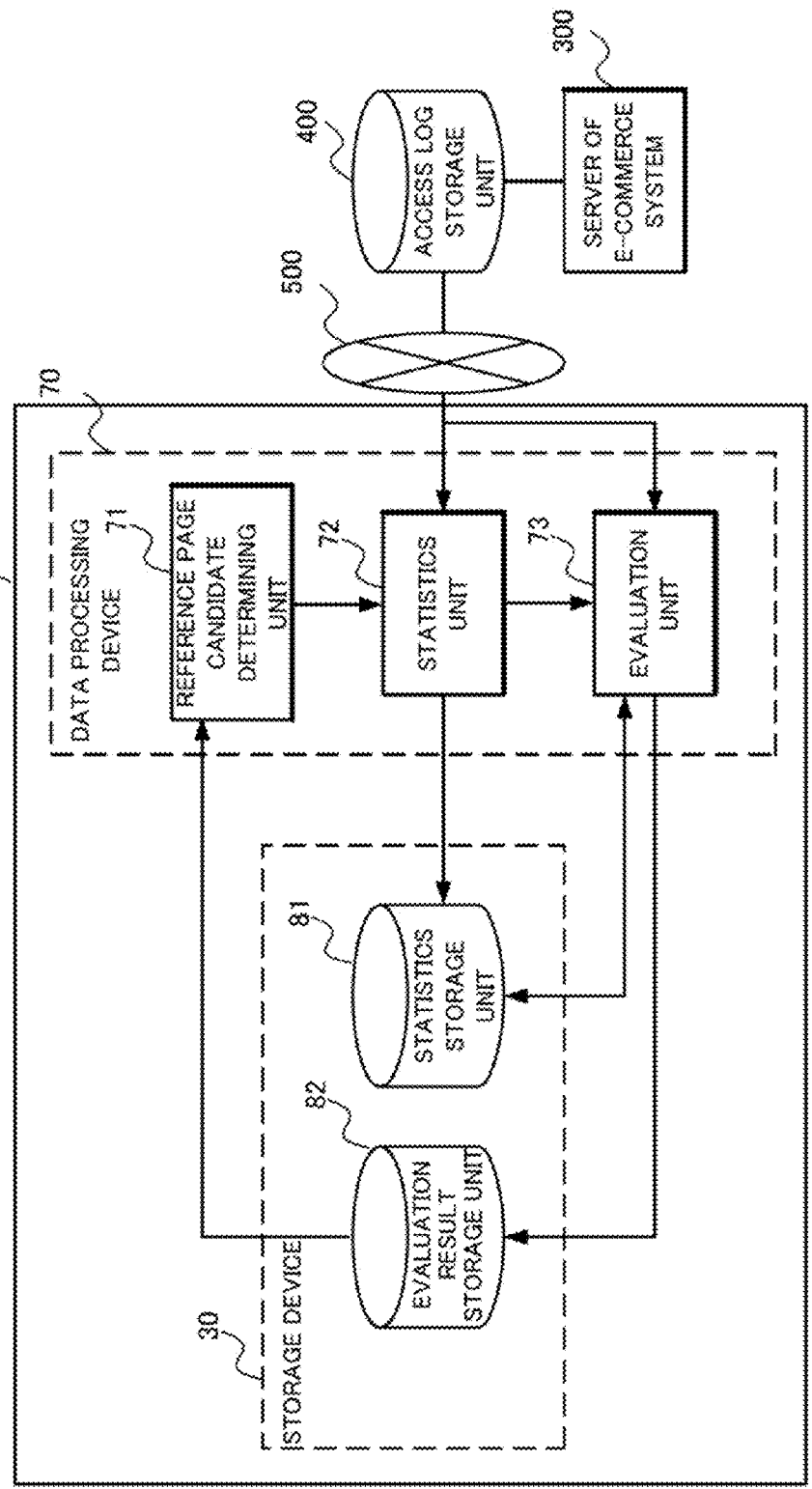
FIG. 16 is a block diagram showing a structure of a session control device according to a fourth exemplary embodiment of the present invention.

With reference to FIG. 16, the session control device 10 according to the fourth exemplary embodiment of the present invention includes the input device 40 such as a keyboard, a data processing device 70 operable under the control of a program and the storage device 30 for storing information.

The server 300 of an E-commerce system and the access log storage unit 400 in which a history of requests accessed to the E-commerce system is recorded are connected to a data processing device 70 through the network 500 such as an intranet.

The storage device 30 comprises a statistics storage unit 81 and an evaluation result storage unit 82.

The statistics storage unit 81, assuming that every time a session passes through a page whose effect on the purchase processing of the E-commerce site is large, the session changes its stage, stores a statistics result related to operation of a session on a stage basis.

The evaluation result storage unit 82 stores a result obtained by evaluating, by an evaluation unit 73, validity of a reference page candidate listed by a reference page candidate determining unit 71.

The data processing device 70 comprises the reference page candidate determining unit 71, a statistics unit 72 and the evaluation unit 73.

With a page which can be a reference for the discrimination between an arrival session and a session yet to arrive by making a request at the E-commerce site considered as a reference page, the reference page candidate determining unit 71 lists candidates for a reference page and transfers the reference page candidates to the statistics unit 72.

In addition, the reference page candidate determining unit 71 refers to an obtained evaluation result from the evaluation result storage unit 82 to add a reference page candidate to a combination of candidates in descending order of evaluation. At every addition, the statistics unit 72 and the evaluation unit 73 evaluate a combination of candidates.

When a certain reference page candidate is added to a combination of candidates, if evaluation has no difference as compared with that as of before addition, delete the added reference page candidate from the combination of candidates. Thus, derive a combination of candidates which include the least number of reference page candidates and whose evaluation is high.

The statistics unit 72 receives a reference page candidate or a combination of candidates from the reference page candidate determining unit 71. Further read a request sequence of each session from the access log storage unit 400 and every time a session requests a reference page candidate, change a stage to which the session belongs and record the operation of the session at each stage. Then, calculate statistics about what percentage of sessions operate how and store the result in the statistics storage unit 81.

The evaluation unit 73 reads a request sequence of a session from the access log storage unit 400 and while collating the read sequence with a statistics result in the statistics storage unit 81, applies an index to the session.

Apply to a session as an index is, for example, a probability of arrival of a session at the purchase processing or an average number of successive requests when reaching the purchase processing. Repeat the same processing with respect to several sessions stored in the access log storage unit 400, evaluate whether an arrival request and a request yet to arrive can be satisfactorily discriminated by an index applied to the session and store an evaluation result in the evaluation result storage unit 82.

Although shown in the session control device 10 according to the fourth exemplary embodiment is only a structure for determining a reference page, the components shown in the session control device 10 according to the first exemplary embodiment, the second exemplary embodiment or the third exemplary embodiment are also provided in the data device 70 and the storage device 30 to execute session control operation in each of the respective exemplary embodiments.

Figure 17:
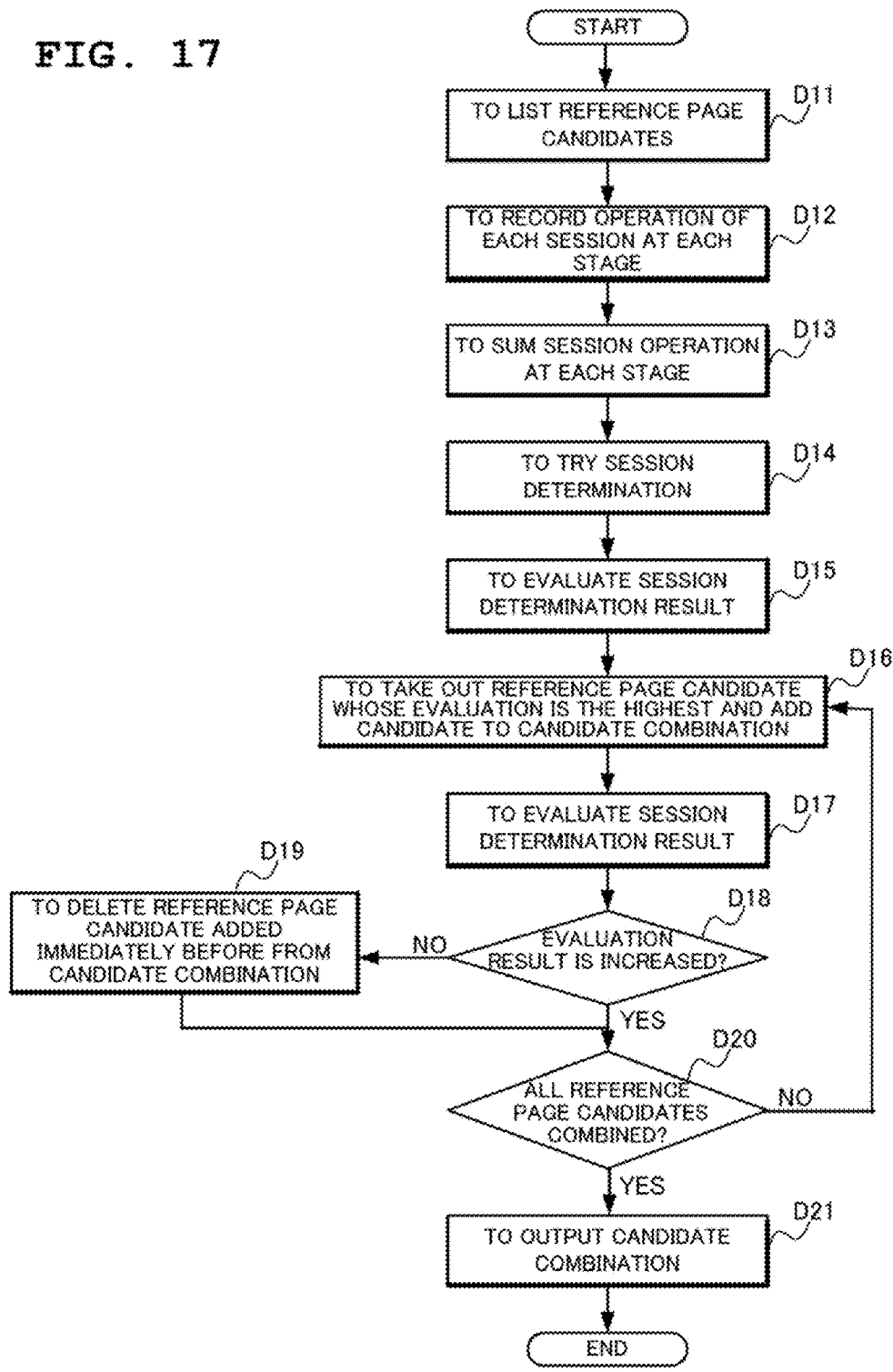
FIG. 17 is a flow chart showing operation of selecting a reference page according to the fourth exemplary embodiment of the present invention.

Next, operation of the session control device 10 according to the fourth exemplary embodiment will be detailed with reference to FIG. 16 and the flow chart of FIG. 17.

First, the reference page candidate determining unit 71 transfers all the web pages provided at the E-commerce site to the statistics unit 72 one by one as a reference page candidate (Step D11).

The statistics unit 72 reads a request sequence of each session from the access log storage unit 400 and at every request for a reference page candidate by a session, changes a stage to which the session belongs and records the contents of operation of the session at each stage (Step D12). More specifically, as the contents of session operation, record the number of requests from the start of a stage of an arrival session and a session yet to arrive until shifting to other stage.

After repeating Step D12 with respect to several sessions, the statistics unit 72 calculates statistics result related to the session operation contents at each stage and stores the result in the statistics storage unit 81 (Step D13). Calculated at each stage as a statistics result related to the session operation contents are, for example, a ratio of achieved sessions to sessions yet to arrive which ratio varies as requests continue and a rate of sessions belong to the stage among all the session.

Next, the evaluation unit 73 reads a request sequence of each session from the access log storage unit 400 and uses the statistics result stored in the statistics storage unit 81 to determine whether the session is an achieved session or a session yet to arrive (Step D14). After repeating Step D14 with respect to several sessions, evaluate to what extent an arrival session and a session yet to arrive are discriminated and store the evaluation result in the evaluation result storage unit 82 (Step D15).

After evaluation of all the reference page candidates is completed, the reference page candidate determining unit 71 refers to the evaluation result storage unit 82 to take out a reference page candidate whose evaluation is high and adds the candidate to a combination of reference page candidates (Step D16). In other words, generate a combination of reference page candidates. By using the statistics unit 72 and the evaluation unit 73, evaluate a combination of candidates similarly to Step D12 through Step D15 and store the evaluation result in the evaluation result storage unit 82 (Step D17).

Check whether addition of the reference page at Step D16 increases evaluation of the combination of the candidates or not (Step D18). When the evaluation of the combination of candidates is not increased, delete the reference page added at Step D16 from the combination of candidates (Step D19). Next, with respect to all the reference page candidates, check whether the processing of Step D16 through Step D19 is executed or not (Step D20).

When the processing is executed with respect to all the combinations of the reference page candidates, output a combination of candidates whose evaluation result is the highest as a reference page combination to the output device or the like (Step D21). When at Step D20, there remains a reference page candidate whose combination is yet to be made, repeat Step D16 through D19.

(Mode of Implementation)

Next, a mode of implementation of the fourth exemplary embodiment will be described.

Assume that in the access log storage unit 400, request sequences are sequentially stored on a session basis as illustrated in "access log" of FIG. 10.

The reference page candidate determining unit 71 lists all the web pages provided by the E-commerce site shown in the example of FIG. 10, "Home", "Search Product", "Best Seller", "New Products", "Product Detail", "Shopping Cart", "User Login" and "Buy Conform" and input them as reference page candidates to the statistics unit 72.

In the operation of the present mode of implementation, the statistics unit 72 executes the same operation as that of the arrival rate calculating unit 21 shown in FIG. 10 and calculates a rate of arrival session on each stage and stores the result in the statistic storage unit 81.

The evaluation unit 73 reads a request sequence of each session from the "access log" and sequentially records a stage and the number of requests at the stage starting with a first request of the request sequence.

Figure 18:
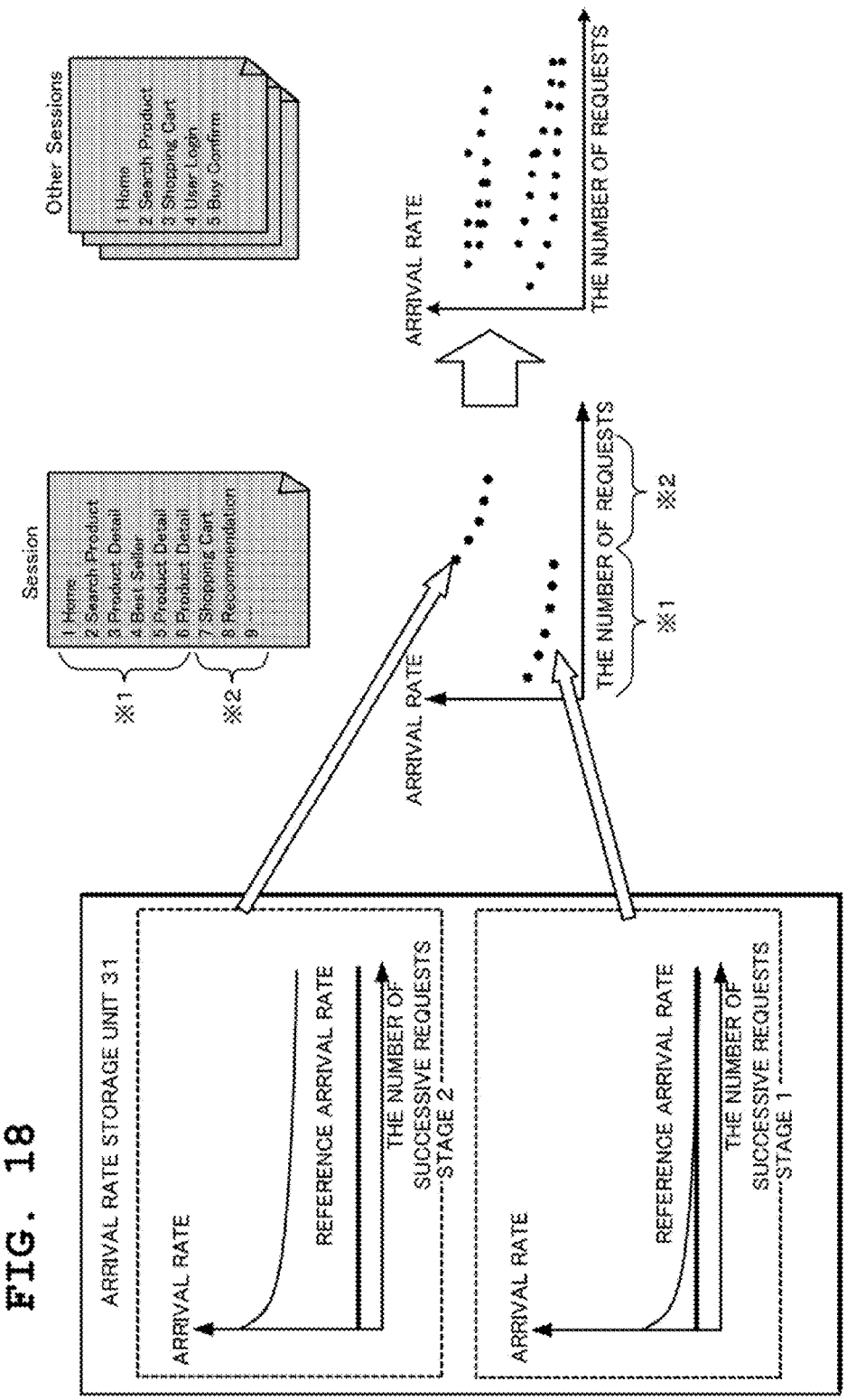
FIG. 18 is a diagram showing a mode of implementation according to the fourth exemplary embodiment of the present invention.

Next, the evaluation unit 73 refers to the statistics storage unit 81 to calculate an arrival rate which is a rate of arrival sessions among sessions and record the arrival rate for each number of requests on the graph as shown in FIG. 18. Repeat the same processing with respect to several sessions recorded in the "access log" and record all the results on the graph.

Next, the evaluation unit 73 evaluates approximately how many sessions can be allotted as being an arrival session/a session yet to arrive by using the reference page candidates.

Since the larger the difference in an arrival rate of each session becomes, the easier the determination whether the session arrives at a purchase page can be made, calculate a dispersion value of the graph obtained as shown in FIG. 18 and consider the value as an evaluation result. The evaluation unit 73 stores an evaluation result of each reference page in the evaluation result storage unit 82 as shown in FIG. 19.

While shown is the example where a dispersion value is used as an evaluation result, any index can be used, not limited to a dispersion value, that can indicate a difference in an arrival rate.

When evaluation is completed with respect to all the reference page candidates, the reference page candidate determining unit 71 generates a combination of candidates starting with a reference page candidate whose evaluation is high and evaluates a candidate combination similarly to FIG. 10 and FIG. 18. When a certain new reference page candidate is added to a candidate combination, if its evaluation has no change before the addition and after the addition, remove the added reference page candidate from the candidate combination.

Effects of the Fourth Exemplary Embodiment

Since the fourth exemplary embodiment is structured to derive a reference page whose evaluation is high by a statistic manner, a reference page can be found by which determination whether a session is an arrival session or a session yet to arrive can be effectively made.

In addition, the present exemplary embodiment enables the number of combinations of candidates to be reduced by first adopting a reference page whose evaluation is high for a candidate combination. Since reduction in the number of combinations (the number of reference pages) leads to the reduction in the number of stages, a determination whether a session is an arrival session or a session yet to arrive can be made by a small storage capacity.

Moreover, since a reference page is derived on a basis of each kind of E-commerce system 300, the present exemplary embodiment obtains an appropriate reference page meeting an access tendency varying with each E-commerce system.

Fifth Exemplary Embodiment

Next, a fifth exemplary embodiment of the present invention will be detailed with reference to the drawings.

Figure 20:
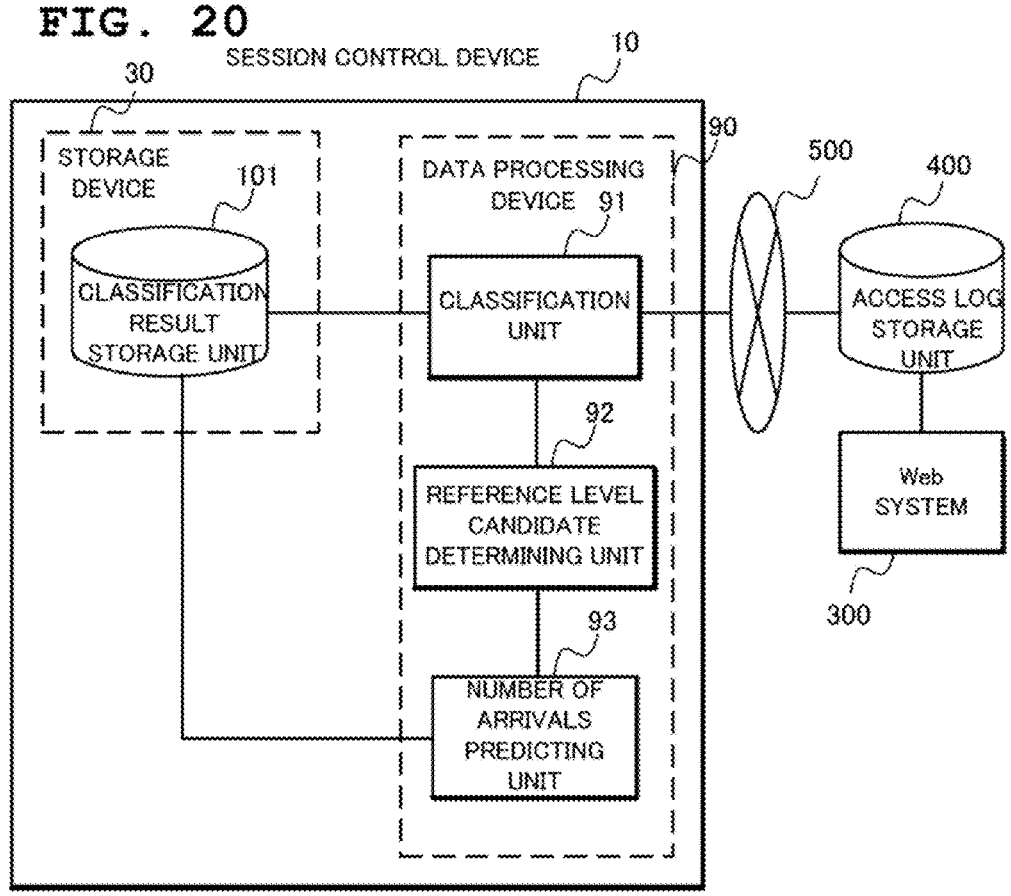
FIG. 20 is a block diagram showing a structure of a session control device according to a fifth exemplary embodiment of the present invention.

With reference to FIG. 20, the session control device 10 according to the fifth exemplary embodiment of the present invention includes a data processing device 90 operable under the control of a program and the storage device 30 for storing information.

The server 300 of an E-commerce system and the access log storage unit 400 in which a history of requests accessed to the E-commerce system is recorded are connected to the data processing device 90 through the network 500 such as an intranet.

The storage device 30 comprises a classification result storage unit 101.

The classification result storage unit 101 stores a probability of shifting between levels per unit time assuming that sessions of the E-commerce system 300 are classified into two, a high level and a low level, by a rate of an arrival at the purchase processing.

The data processing device 90 comprises a reference level candidate determining unit 92, a classification unit 91 and a number of achievements predicting unit 93.

The reference level candidate determining unit 92, at the time of classifying sessions into two by a rate of arrival at the purchase processing, sets a reference arrival rate to be a reference and transfers the same to the classification unit 91. Furthermore, when setting a reference arrival rate, receive the number of arrival requests that the E-commerce system 300 can receive from the number of achievements predicting unit 93.

Thus, while changing a value of a reference arrival rate, derive a reference arrival rate at which the number of arrival requests is the largest.

The classification unit 91 reads, from the access log storage unit 400, request sequences of a plurality sessions which make accesses simultaneously and calculates a rate of arrival at the purchase processing with respect to each session. Next, compare a reference arrival rate applied by the reference level candidate determining unit 91 and an arrival rate of each session to classify a session whose arrival rate is not less than the reference arrival rate into a high level session and a session whose arrival rate is less than the reference arrival rate into a low level session.

Furthermore, per unit time, calculate a probability that a high level session will go to a low level, a probability that a low level session will go to a high level, a probability that a high level session will maintain a high level, a probability that a low level session will maintain a low level, a probability that a high level session will arrive at the purchase processing and a probability that a low level session will arrive at the purchase processing and store them in the classification result storage unit 101.

The number of achievements predicting unit 93 predicts the number of arrivals at the purchase processing when a session whose arrival rate is lower than the reference arrival rate is rejected based on a probability of shifting between levels stored in the classification result storage unit 101 and transfers the prediction result to the reference level candidate determining unit 92.

Although shown in the session control device 10 according to the fifth exemplary embodiment is only a structure for selecting a reference arrival rate, the components shown in the session control device 10 according to the first exemplary embodiment or the second exemplary embodiment are also provided in the data device 90 and the storage device 30 to execute the session control operation according to each of the respective exemplary embodiments.

Figure 21:
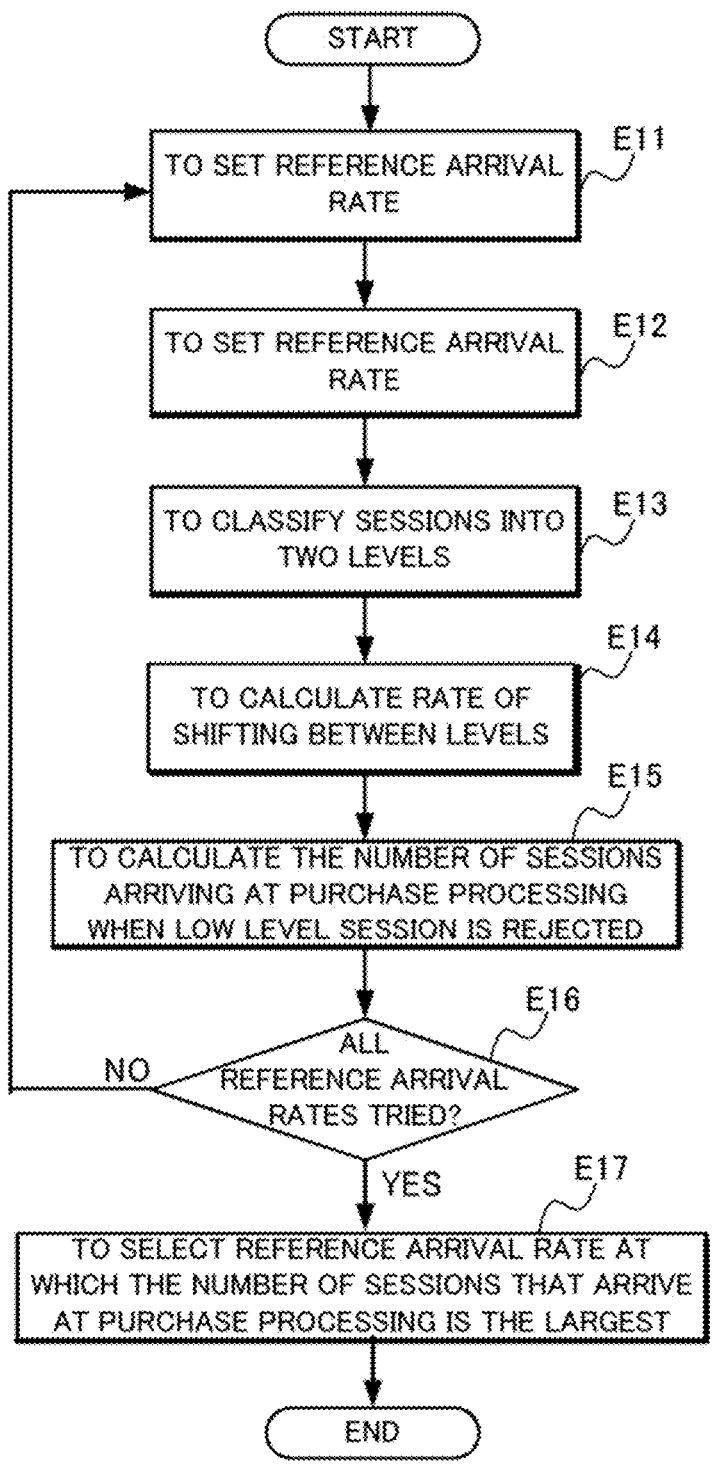
FIG. 21 is a flow chart showing operation of determining a reference arrival rate according to the fifth exemplary embodiment of the present invention.

Next, entire operation of the present mode of implementation will be detailed with reference to FIG. 20 and the flow chart shown in FIG. 21.

First, the reference level candidate determining unit 92 sets a reference arrival rate as a reference for classifying sessions into two by a rate of arrival at the purchase processing to be a certain value and transfers the value to the classification unit 91 (Step E11).

The classifying unit 91 reads, from the access log storage unit 400, request sequences of a plurality of sessions which make accesses simultaneously and calculates a rate of arrival at the purchase processing with respect to each session (Step E12).

Next, compare a reference arrival rate applied at Step D1 and the arrival rate of each session to classify a session whose arrival rate is not less than the reference arrival rate into a high level session and a session whose arrival rate is less than the reference arrival rate into a low level session (Step E13).

Figure 22:
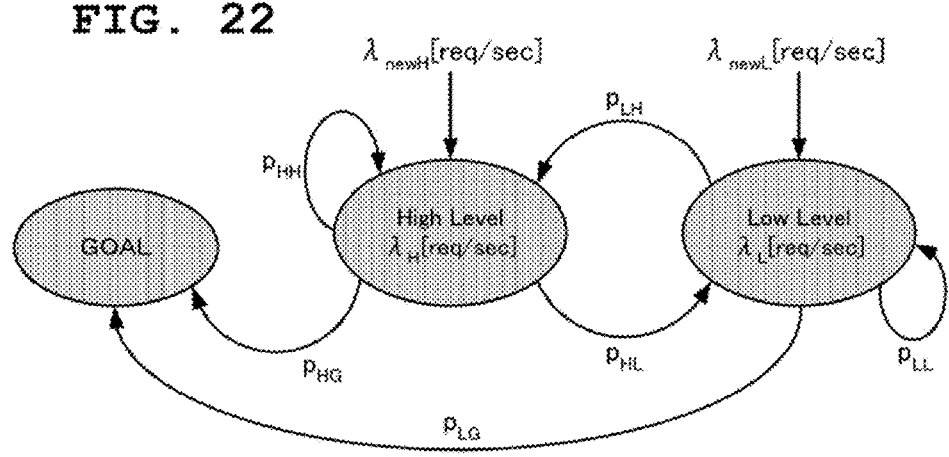
FIG. 22 is a diagram showing a relationship of a rate of session shifting between levels according to the fifth exemplary embodiment of the present invention.

Furthermore, according to an arrival rate of a session changing with time passage, repeat the re-classification of sessions to calculate such a rate of session shifting between levels as shown in FIG. 22 (Step E14). In addition, calculate the number of sessions per unit time that reach the purchase processing at each level and store the same in the classification result storage unit (Step E15).

In FIG. 22, $\lambda$newH represents the number of sessions added to a high level per unit time, $\lambda$newL represents the number of sessions added to a low level per unit time, $\lambda$H represents the number of sessions of a high level per unit time, $\lambda$L represents the number of sessions of a low level per unit time, PHH represents a probability that a high level session maintains a high level, PLL represents a probability that a low level session maintains a low level, PHL represents a probability that a high level session attains a low level, PLH represents a probability that a low level session attains a high level, PHG represents a probability that a high level session arrives at the purchase processing and PLG represents a probability that a low level session arrives at the purchase processing. GOAL in FIG. 22 represents that a session arrives at the purchase processing.

Next, by the following procedure, the number of achievements predicting unit 93 calculates the maximum number of sessions that can arrive at the purchase processing when a low level session is rejected.

The number of high level sessions $\lambda$H at a certain Step St is expressed as a sum of the number of sessions maintaining a high level after the execution of one request ($\lambda$HPHH) among high level sessions at an immediately preceding Step St-1, the number of sessions shifting to a high level after the execution of one request ($\lambda$LPLH) among low level sessions at Step St-1, and the number of sessions belonging to a high level among sessions newly connected at Step St (the following Expression 1).

(EXPRESSION 1)

$$\lambda_H = \lambda_H p_{HH} + \lambda_L p_{LH} + \lambda_{newH} \quad \text{Expression 1}$$

Obtaining $\lambda$H from the Expression 1 leads to the following Expression 2.

(EXPRESSION 2)

$$\lambda_H = \frac{\lambda_L p_{LH} + \lambda_{newH}}{1 - p_H^H} \quad \text{Expression 2}$$

The number of low level sessions $\lambda$L at a certain Step St is expressed as a sum of the number of sessions maintaining a low level after the execution of one request ($\lambda$LPLL) among low level sessions at an immediately preceding Step St-1, the number of sessions shifting to a low level after the execution of one request ($\lambda$HPHL) among high level sessions at Step St-1, and the number of sessions belonging to a low level among sessions newly connected at Step St (the following Expression 3).

(EXPRESSION 3)

$$\lambda_L = \lambda_L p_{LL} + \lambda_H p_{HL} + \lambda_{newL} \quad \text{Expression 3}$$

Obtaining $\lambda$H from the Expression 3 leads to the following Expression 4.

(EXPRESSION 4)

$$\lambda_L = \frac{\lambda_H p_{HL} + \lambda_{newL}}{1 - p_{LL}} \quad \text{Expression 4}$$

Replacing $\lambda$H in the Expression 4 by the Expression 2 obtains the following Expression 5.

(EXPRESSION 5)

$$\lambda_L = \frac{\lambda_{newH} p_{HL} + \lambda_{newL} \cdot (1 - p_{HH})}{(1 - p_{HH})(1 - p_{LL}) - p_{HL} \cdot p_{LH}} \quad \text{Expression 5}$$

Next, calculate the number of high level sessions which become executable by rejecting all the low level sessions by the following Expression 6.

(EXPRESSION 6)

$$\lambda'_H = \lambda_H + \lambda_L \quad \text{Expression 6}$$
$$= \frac{\lambda_{newH}}{1 - p_{HH}} + \frac{\lambda_{newH} p_{HL} + \lambda_{newL} \cdot (1 - p_{HH})}{(1 - p_{HH})(1 - p_{LL}) - p_{HL} \cdot p_{LH}}$$

Lastly, calculate the number of sessions arriving at the purchase processing per unit time by using Expression 7 which is derived by using the Expression 6.

(EXPRESSION 7)

$$\lambda'_G = p_{HG} \cdot (\lambda_H + \lambda_L) \quad \text{Expression 7}$$
$$= p_{HG} \cdot \left( \frac{\lambda_{newH}}{1 - P_{HH}} + \frac{\lambda_{newH} p_{HL} + \lambda_{newL} \cdot (1 - p_{HH})}{(1 - p_{HH})(1 - p_{LL}) - p_{HL} \cdot p_{LH}} \right)$$

The classification unit 92 checks whether Step E11 through Step E15 are executed by using all the reference arrival rates (Step E16). When other reference arrival rate is yet to be executed, repeat the processing of Step E11 through Step E15 with respect to a reference arrival rate yet to be executed.

When it is found at Step E16 that all the reference arrival rates are executed, select a reference arrival rate at which the number of sessions that arrive at the purchase processing per unit time is the largest among the reference arrival rates and output the same to an output device such as a display.

Effects of the Fifth Exemplary Embodiment

Since the fifth exemplary embodiment is structured to select a reference arrival rate at which the number of sessions arrive at the purchase processing per unit time is the largest, even when accesses avalanche to a site, profits of the site can be maximized by rejecting a session whose arrival rate is low.

In addition, since it is structured to select an appropriate reference arrival rate from the access log storage unit 400, a reference arrival rate can be derived in a short time period without affecting a system in practice, thereby instantly coping with a change in the number of sessions and in an access tendency.

INCORPORATION BY REFERENCE

This application is based upon and claims the benefit of priority from Japanese patent application No. 2007-173267, filed on Jun. 29, 2007, the disclosure of which is incorporated herein in its entirety by reference.

INDUSTRIAL APPLICABILITY

The present invention is applicable for such use as a load management device which adjusts a load while giving preference to transaction whose priority is high in a data base server, an application server or the like, and a program for realizing the load management device. Also applicable for use is a site analysis tool for improving a rate of purchases of an E-commerce site.

What is claimed is:

1. A session control device connected to a web site and a client terminal which accesses said web site through a network, comprising:
    a processor; and
    a memory;
    wherein said processor implements:
        an occupancy rate calculating unit configured to calculate, with a state of a session in each access to a reference page which is a page whose effect is large on arrival at processing whose importance in the web site is high as a stage, rates of arrival sessions which arrive at said processing whose importance is high and sessions yet to arrive with respect to each number of requests at each stage;
        a determination unit configured to set the limited number of requests on a stage basis such that the largest number of sessions yet to arrive can be rejected within a range in which a rate of rejection of an arrival session is not less than a minimum guaranteed rate indicative of a rate of arrival sessions which are not limited; and
        a collation unit configured to count the number of requests at a stage of said session received from said client terminal and configured to compare said number of requests counted and said limited number to determine whether to limit said session from said client terminal;
    wherein:
        when said number of requests fails to exceed said limited number, said collation unit transfers said session to said web site; and
        when said number of requests exceeds said limited number, transmits, to said client terminal, a response message notifying that said session is limited.

2. A session control device connected to a web site and a client terminal which accesses said web site through a network, comprising:
    a processor; and
    a memory;
    wherein said processor implements:
        an occupancy rate calculating unit configured to calculate, with a state of a session in each access to a reference page which is a page whose effect is large on arrival at processing whose importance in the web site is high as a stage, rates of arrival sessions which arrive at said processing whose importance is high and sessions yet to arrive with respect to each number of requests at each stage;
        a determination unit configured to set the limited number of requests on a stage basis such that the largest number of sessions yet to arrive can be rejected within a range in which a rate of rejection of an arrival session is not less than a minimum guaranteed rate indicative of a rate of arrival sessions which are not limited; and
        a collation unit configured to count the number of requests at a stage of said session received from said client terminal and configured to compare said number of requests counted and said limited number to determine whether to limit said session from said client terminal;
    wherein said occupancy rate calculating unit reads a request history from an access log of said web site on a session basis to calculate rates of arrival sessions which arrive at said processing whose importance is high and sessions yet to arrive with respect to each number of requests at each stage.

3. A session control method by a session control device connected to a web site and a client terminal which accesses said web site through a network, comprising the steps of:
    calculating, with a state of a session in each access to a reference page which is a page whose effect is large on arrival at processing whose importance in the web site is high as a stage, rates of arrival sessions which arrive at said processing whose importance is high and sessions yet to arrive with respect to each number of requests at each stage;
    setting the limited number of requests on a stage basis such that the largest number of sessions yet to arrive can be rejected within a range in which a rate of rejection of an arrival session is not less than a minimum guaranteed rate indicative of a rate of arrival sessions which are not limited; and
    counting the number of requests at a stage of said session received from said client terminal and comparing said number of requests counted and said limited number to determine whether to limit said session from said client terminal;
    wherein at said collation step, when said number of requests fails to exceed said limited number, said session is transferred to said web site and when said number of requests exceeds said limited number, a response message notifying that said session is limited is transmitted to said client terminal.

4. A session control method by a session control device connected to a web site and a client terminal which accesses said web site through a network, comprising the steps of:
    calculating, with a state of a session in each access to a reference page which is a page whose effect is large on arrival at processing whose importance in the web site is high as a stage, rates of arrival sessions which arrive at said processing whose importance is high and sessions yet to arrive with respect to each number of requests at each stage;
    setting the limited number of requests on a stage basis such that the largest number of sessions yet to arrive can be rejected within a range in which a rate of rejection of an arrival session is not less than a minimum guaranteed rate indicative of a rate of arrival sessions which are not limited; and counting the number of requests at a stage of said session received from said client terminal and comparing said number of requests counted and said limited number to determine whether to limit said session from said client terminal;

wherein at said occupancy rate calculating step, a request history is read from an access log of said web site on a session basis to calculate rates of arrival sessions which arrive at said processing whose importance is high and sessions yet to arrive with respect to each number of requests at each stage.

5. A non-transitory computer-readable medium storing a session control program executed on a computer connected to a web site and a client terminal which accesses said web site through a network, wherein said session control program causes said computer to execute the processing of:

calculating, with a state of a session in each access to a reference page which is a page whose effect is large on arrival at processing whose importance in the web site is high as a stage, rates of arrival sessions which arrive at said processing whose importance is high and sessions yet to arrive with respect to each number of requests at each stage;

setting the limited number of requests on a stage basis such that the largest number of sessions yet to arrive can be rejected within a range in which a rate of rejection of an arrival session is not less than a minimum guaranteed rate indicative of a rate of arrival sessions which are not limited; and counting the number of requests at a stage of said session received from said client terminal and comparing said number of requests counted and said limited number to determine whether to limit said session from said client terminal;

wherein in said collation processing, when said number of requests fails to exceed said limited number, said session is transferred to said web site and when said number of requests exceeds said limited number, a response message notifying that said session is limited is transmitted to said client terminal.

6. A non-transitory computer-readable medium storing a session control program executed on a computer connected to a web site and a client terminal which accesses said web site through a network, wherein said session control program causes said computer to execute the processing of:

calculating, with a state of a session in each access to a reference page which is a page whose effect is large on arrival at processing whose importance in the web site is high as a stage, rates of arrival sessions which arrive at said processing whose importance is high and sessions yet to arrive with respect to each number of requests at each stage;

setting the limited number of requests on a stage basis such that the largest number of sessions yet to arrive can be rejected within a range in which a rate of rejection of an arrival session is not less than a minimum guaranteed rate indicative of a rate of arrival sessions which are not limited; and counting the number of requests at a stage of said session received from said client terminal and comparing said number of requests counted and said limited number to determine whether to limit said session from said client terminal;

wherein in said occupancy rate calculating processing, a request history is read from an access log of said web site on a session basis to calculate rates of arrival sessions which arrive at said processing whose importance is high and sessions yet to arrive with respect to each number of requests at each stage.

\* \* \* \* \*